(12) United States Patent
Landfield et al.

(10) Patent No.: US 6,354,298 B1
(45) Date of Patent: Mar. 12, 2002

(54) METHOD FOR STORING AND RETRIEVING SEQUENTIAL INFORMATION

(75) Inventors: Philip W. Landfield; Olivier Thibault, both of Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 09/628,556

(22) Filed: Jul. 28, 2000

Related U.S. Application Data

(60) Provisional application No. 60/146,143, filed on Jul. 30, 1999, provisional application No. 60/157,859, filed on Oct. 6, 1999, and provisional application No. 60/187,171, filed on Mar. 2, 2000.

(51) Int. Cl.[7] .............................. A61N 1/00; A61B 5/00

(52) U.S. Cl. ............................ 128/898; 607/3; 600/544

(58) Field of Search ............................ 128/898; 607/2, 607/3, 45, 58; 600/544; 604/891.1

(56) References Cited

U.S. PATENT DOCUMENTS

| | | | |
|---|---|---|---|
| 5,535,170 A | 7/1996 | Imamura et al. |
| 5,611,350 A | 3/1997 | John |
| 5,963,505 A | 10/1999 | Pomet et al. |
| 6,052,326 A | 4/2000 | Kashiwakura et al. |
| 6,061,593 A | 5/2000 | Fischell et al. |
| 6,066,163 A | 5/2000 | John |
| 6,109,269 A | 8/2000 | Rise et al. |

*Primary Examiner*—Jeffrey F. Jastrzab
(74) *Attorney, Agent, or Firm*—McDermott, Will & Emery

(57) ABSTRACT

A method and design is provided for distributing and storing sets of temporally ordered information in a systematic and sequential fashion. This method is based on a model of how the brain functions in the distribution and storage of temporally ordered memories, but it can also be applied to the design of new biological, electronic or optical devices. These devices may be used in the testing and development of new therapeutic drugs, in the detection of toxic agents or impaired performance, or in the development of new industrial and consumer devices in which the orderly storage of sequential information is important.

10 Claims, 8 Drawing Sheets

A. NORMAL

B. IMPROVED MEMORY

C. IMPAIRED MEMORY

A
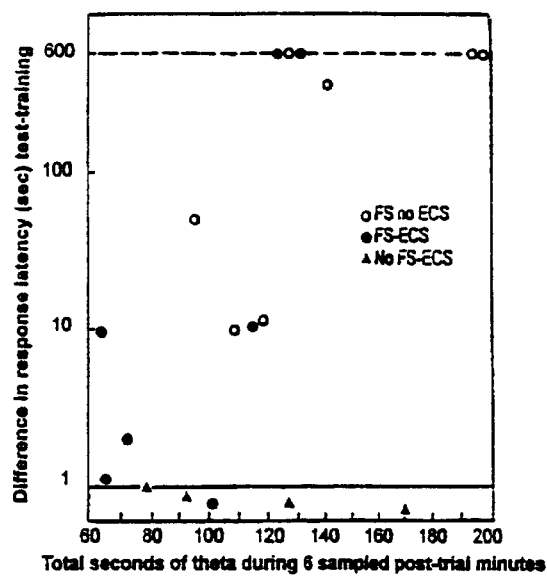
FIG. 3
B
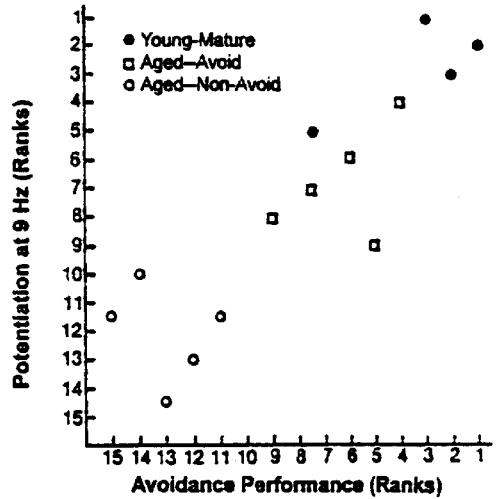
C
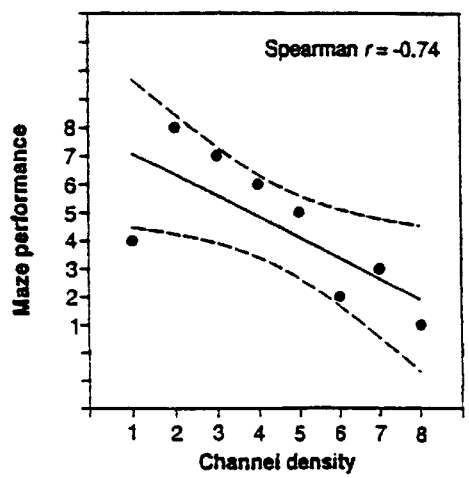

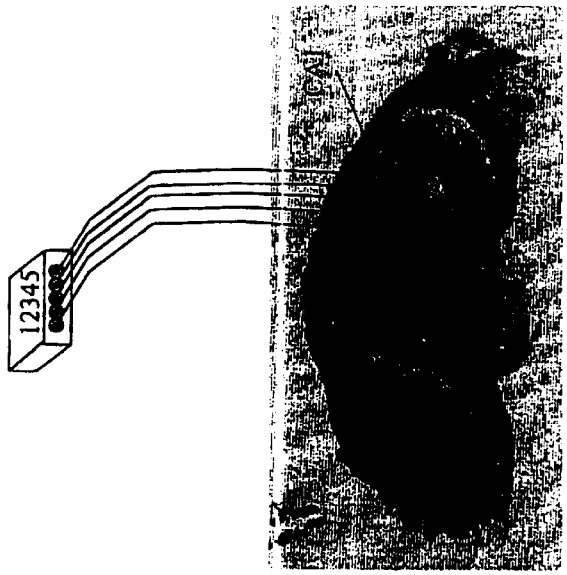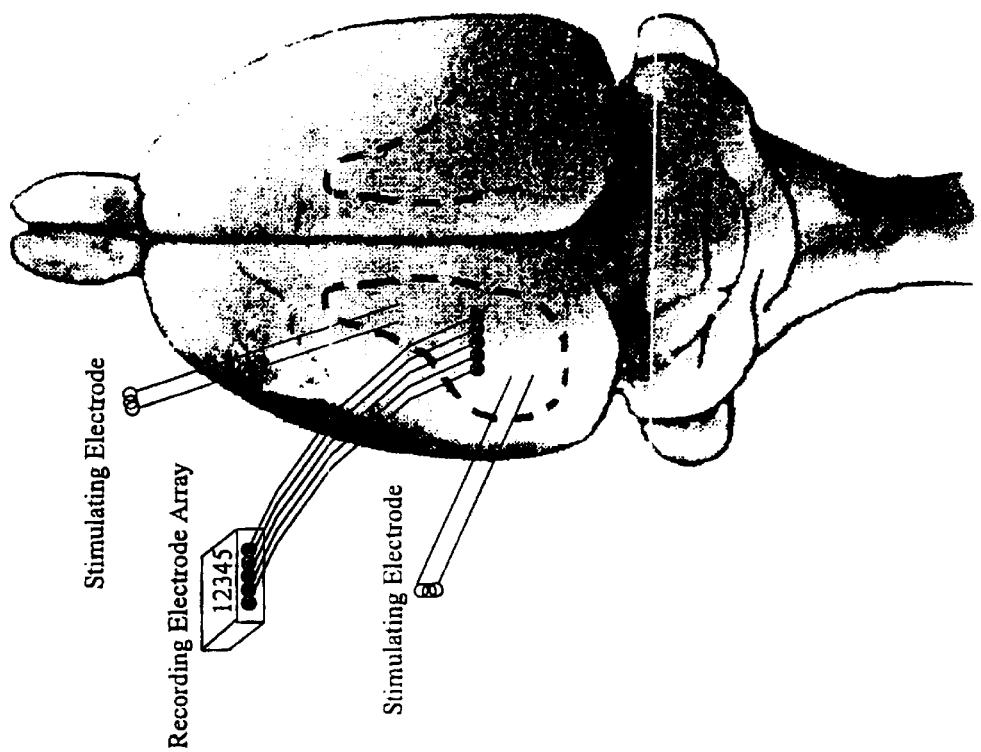
Fig. 6

METHOD FOR STORING AND RETRIEVING SEQUENTIAL INFORMATION

CONTINUING DATA

The present application claims the benefit of priority to U.S. Provisional application Nos. 60/146,143, filed Jul. 30, 1999, 60/157,859, filed Oct. 6, 1999, and 60/187,171, filed Mar. 2, 2000. The contents of these provisional applications are incorporated herein by reference in their entirety.

BACKGROUND OF THE INVENTION

1. Field of the Invention

The present invention relates to a method for storing and retrieving temporal information and applications thereof including devices that use the method of distributing temporal information into arrays of spatial patterns and a method of detecting the efficacy of drugs, toxic substances or treatments on human memory and other cognitive processes.

2. Brief Description of the Related Art

Brief Description of Prior Model: The new design derives loosely from a model the present inventor published of memory functions in the brain (Landfield, 1976). However, the prior model did not address storage of sequential information sets and the emergent elements of the updated model that deal with distribution and storage of temporal information represent a new invention that is not inherent in the prior model. The original model (Landfield, 1976) proposed that memory traces are formed in a neuron in which excitation generated by a non-information containing synchronous EEG wave occurs at approximately the same time as excitation from information-containing impulses arriving over other inputs. The summation of excitation from the two inputs is sufficient to activate the receiving neuron to fire impulses, which then leave lasting traces (memory) in that neuron as well as activate the next neurons in the chain. Because the model relies on summation between two brain waves, this process was noted to be somewhat analogous to the interference patterns formed by two coherent light beams (e.g., laser beams) projected onto a screen, which form light stripes where the wave maxima are in phase, and dark stripes where the wave maxima are out of phase and cancel. These optical patterns are often termed "interference fringes." In addition, because the formation of holograms depends on such interference patterns between a coherent "reference beam" (usually a monochromatic laser beam) and a coherent "object beam" part of the laser beam that is split and reflected off of the object of which the holographic representation is being made), the brain model was also noted to be partly analogous to the interference pattern-holographic process of optics (Landfield, 1976).

However, the nature of neural information is of course substantially different from the phase information carried in reflected light beams in holograms, and some important conceptual differences exist between the brain model and holography. One difference is that, in the brain model, each EEG wave functions as a sampling and encoding mechanism that samples the amount of activity in a neuron within some time frame (generally, the excitatory phase of the EEG wave); that is, the information activity being processed in an assembly of neurons summates with the EEG wave, which is modified in each neuron proportionally to the degree of informational activity stimulating that neuron. The modified wave then transports that encoded "time-slice" of information as it travels through the brain. The next wave of the EEG rhythm captures the next "slice" of temporal information.

Many brain models for processing temporal information have been proposed, but very few deal with long term memory storage of that information. Those that do often propose the storage of sequential information in different oscillatory patterns or regions of the same neurons, or in different activity patterns in linked cell assemblies. However, it is highly difficult or not feasible to store temporally-tagged information in the same neurons.

Utility of the Invention At present, there are massive efforts underway at many pharmaceutical firms to develop new drugs for the improvement of memory, aimed at elderly or neurologically impaired individuals, and perhaps eventually at healthy young adults as well. One of the major problems of this drug development work, however, is that there are no rapid screening methods for testing efficacy of drugs on memory. The animal models used can be controversial and the data are not always generalizable to humans; in addition, the present cellular models being developed (e.g., long-term potentiation) are even more controversial (see Russo, "The Scientist" Vol 13, March, 1999).

If the model proposed here is even partially accurate, then it could be used to test the phase shifting, intensity of summation, and rates of travel of excitation through the hippocampus, either in in vitro organotypic brain slices or in animals chronically implanted with standard electrode arrays or other preparations, and therefore could potentially function as an extremely sensitive and accurate screening procedure for development of drugs that influence memory and perhaps other cognitive processes. Moreover, the method could be used by defense, medical, or environmental agencies of companies to detect or evaluate neurotoxic agents that impair memory.

Most electronic memory systems (computers) involve random access memories, in which information sets are stored in available sites and lose sequential information (other than date codes that must be interpreted by the user). The construction of devices that could learn, store and retrieve sequential information in a temporally ordered fashion, therefore, might have vast utility at which we can only begin to guess. This temporal learning capacity might, for example, vastly improve computer graphics or reprogramming of devices based on experience of operation; architectural or industrial designs will also benefit; instrument glitches or errors will be more readily self-corrected; numerous entertainment uses (computer games, holographic graphics, etc.) are also envisioned.

There have been and are intensive major efforts by defense and various research and industrial establishments to develop devices that can learn based on neural network principles. Clearly, the incorporation of a process for learning and storing temporally ordered information would be a major advantage for these efforts. The full range of possible applications is difficult to envision but it can be expected to be extensive based on the recent explosive developments in the electronic/optical industries.

SUMMARY OF THE INVENTION

The new aspect of the model deals with how the brain distributes the traveling informational "time slices" (waves) for storage in different, spatially-distinct neuronal arrays. The present invention stems from the realization that while it is highly difficult or not feasible to store temporally-tagged information in the same neurons, different time-linked information sets are more efficiently stored in separate spatially-distinct arrays of neurons. To accomplish this, we suggest that the brain sends the information-containing wavefronts along sheets of parallel fibers, each of which fiber synapses on (connects to) many dozens to hundreds of neurons sequentially (through synapses of passage).

As new information continuously passes along these parallel fibers, it is not intense enough by itself to activate the neurons to which the axon fibers connect sequentially unless these neurons are also activated simultaneously by another beam of excitation from a separate input source; that is, unless summation occurs. In the model, this separate "beam of excitation" comes from the excitatory phase of a synchronized EEG wave. As the EEG wave sweeps over an array of neurons, all neurons in that array are near-simultaneously depolarized (excited) by synchronized synaptic inputs. This excitation brings them close to threshold for firing impulses. Then, if intense impulses encoding information (high frequencies of firing) arrive over the parallel fiber lines in the same time window of peak EEG excitation, they will summate with the EEG excitation and fire the neurons. Because the excitation generated by the EEG wave is generally equivalent in each neuron, the activation of target neurons will occur proportionally to the intensity of activity on each parallel fiber.

The new principle for temporal storage is that the distribution in separate neuron arrays of temporally sequential information sets is accomplished by the timed, incremental shifting of the "reference beam of synchronized excitation" (excitatory phase of the EEG wave) along the long axis of the parallel fibers, in the plane of information travel. This shift allows the next array of neurons to be brought close to threshold just as the next set of temporal information arrives, thereby enabling it to respond to (through summation) the information input. A further shift of the "reference beam of excitation" along the axis of wave travel can "prime" or "enable" still another array along the parallel fibers, such that the next information set activates only that next array of neurons, and so on.

The timed, incremental shift of the "reference beam of excitation" along the axis of information travel (parallel fibers) can theoretically occur at any rate which is compatible with the rates of information transmission and storage appropriate for that system. In the brain model, however, the shift is synchronized in time such that the next sequential array is "enabled" (excited) by the reference beam just as the next information-containing rhythmic EEG wave ("information beam") arrives over the parallel fibers at the same array.

In the brain model, the phase shift in "reference excitation" is accomplished by sequential delays in the activation of the interneurons that generate the EEG wave. However, for purposes of the invention, any mechanism that incrementally shifted a "process of enablement" along the axis of informational content travel would be equivalent.

Similarly, whereas the mechanism of "enablement" of neural arrays in the brain model is summation of excitation in neurons, any other mechanism that selectively brought an array of storage elements to a responsive (enabled) state, and did so in spatially distinct arrays in a temporally incremental manner such that different arrays responded to different information sets sequentially, would be equivalent for purposes of the invention.

In the nervous system, equivalent enabling processes to the EEG rhythm mechanism proposed could, for example include rebounds from inhibition, biochemical changes at synapses, or recurrent collateral excitation, among others. In instrument devices built on these principles, equivalent processes could include electrical biases on element inputs, photonic activation, modulation of circuit switches, or mechanical switching, among many other possibilities.

These examples would be equivalent because the essential factor of the invention, whether biological or electronic, is a timed, incrementally shifting state of response enablement along the direction of information set travel, such that multiple spatially distinct arrays of response/storage elements become responsive in an orderly sequence. With this process, selected arrays become sequentially enabled in time and space to respond to or store temporally ongoing information sets that pass by the arrays over time. Thus, this mechanism allows the sequential "capture" of different "time slices" of information from a continuous flow and distributes them in spatially distinct arrays of elements, with each spatial array becoming enabled and then unenabled in temporal sequence. In addition, any recall system that involved the sequential re-activation of these arrays, with the goal of retrieving the temporally ordered information, would be a subset of this invention.

Over 20 years ago, it was proposed that during the formation, storage and retrieval of memory traces, the hippocampal theta rhythm (HTR) functioned somewhat analogously to coherent laser beams in holography, that is by forming "interference patterns" (Landfield, 1976 In: *Molec. & Func. Neurobiol.*, Elsevier, W. H. Gispen, ed. P.390–424). This proposal was supported in part by evidence that electrically driving the HTR with ~7Hz septal stimulation can facilitate memory consolidation (Landfield, *Physiol. Behav.* 1977; Destrade, *Brain Res.* 1982). Since then, there has been much evidence consistent with this model. The present invention is directed to the application of an update of the original model. Novel mechanisms for the sequential storage of temporally ordered information-containing wavefronts have been incorporated. As wavefronts are sequentially projected from dentate gyrus to CA1 at theta frequencies, it is proposed that spatially adjacent, longitudinally oriented arrays of pyramidal cells are sequentially enabled to respond to the waves, such that Wave 1 activates and is stored in Array 1, Wave 2 is then stored in the next array (Array 2), Wave 3 in Array 3, and so on. Thus temporal sequence is converted to spatial order. Sequential enablement is accomplished by a synchronized phase shift of the excitatory peak of theta along the transverse direction of wave travel which activates the next neuronal array as the next theta wave of information arrives. This shift is governed by a combination of inhibitory and excitatory interneurons that "reset" theta in the next array, and by afterhyperpolarizations that protect recently activated arrays from reactivation. This temporal memory process would function somewhat like a series of holographs that could be readily recreated in spatial sequence (retrieval).

In addition, memories in the brain undergo multiple steps of processing, including indexing, distillation, symbolic associations and incorporation into other sets of associations. These different levels or steps of processing can occur sequentially in different arrays of memory units. Therefore, another variation of this invention includes any system of spatially adjacent or spatially ordered arrays of memory elements that are enabled in sequence, in a manner synchronized with the transformation or the arrival of the next level of processing of an information series. This memory storage system therefore functions not only to store in adjacent arrays the different information traces of similar levels of organization that occur sequentially in time, but in addition, functions to store in adjacent arrays the different levels of organization and processing of the same information trace as these levels develop sequentially, not necessarily in temporal sequence.

For example, an information trace is stored in the first spatial array and, in addition to being stored, undergoes an important transformation, distillation, or other form of processing, and subsequently emerges in its new form from the initial array. This second processed form of the original information series is then stored in the second array of memory units (neurons or other elements). Furthermore, the second level of trace organization is subjected to additional processing and transformation, to a third level of organization, and so on. Each new level of organization is stored in a new spatial array of memory units which was either localized adjacently or otherwise ordered along connecting elements that ensured its orderly sequential enablement for storage and later, its orderly activation for recall of that new stage of information processing.

In one aspect, the invention comprises storage and recall systems that convert temporally sequential information into a predetermined spatial organization, based on "hard-wired" connections and/or programmed properties of the units and intra-array connections. This temporal information can involve sequential but different information patterns of the same level of organization (time slices) or it can involve sequential phases of processing/transformation and different levels of organization of the same original set of information.

One embodiment of the present invention relates to a method and memory device for storing temporally sequential information in an array of fixed interconnected memory storage units. Accordingly, the temporally sequential information is applied to the array of fixed interconnected memory storage units; and each of the fixed interconnected memory storage units is successively activated in sequence to store a corresponding time slice of the temporally sequential information.

An aspect of the method of the invention also includes recall of the different levels or phases of processing in an orderly sequential pattern of spatial activation (including forward or reverse activation), just as does recall of the temporal information (time slices) of similar levels of organization by orderly spatial activation.

Another aspect of the invention, the conversion of temporally sequential information patterns to a predetermined spatial organization of adjacent or otherwise spatially organized arrays of memory units that ensures the faithful sequential activation of the arrays, has been illustrated primarily with an example in which a beam of excitation or electrical bias, or other form of enablement, travels in the same direction of information or processing, sequentially enabling one spatially ordered array after another. However, neuronal arrays are usually interconnected with one another, and another form of the invention is if the activation of the first array of units was sufficient to activate the second (next) in sequence at the proper time to store the second information trace (time slice) or second level of processing, and then the activation of the second array units was sufficient to enable the 3rd array to store the 3rd (next) information set, and so on. In this variation, no extraneous incremental, synchronizing mechanism of enablement is necessary, because the sequential enablement would be governed by the pre-wired connections between the different arrays. In this variation, storage and/or processing of information in the first array would automatically enable the next (second) array in preparation for storing/processing the second (next) set or phase of information. The output connections of the first array would automatically ensure enablement of the second array in the appropriate time frame and pattern or would automatically transfer the processed set of information to the next spatial array in appropriate sequence.

Any pre-wired or pre-programmed intra-array connective system for enabling and/or activating adjacent, or functionally adjacent, spatial arrays of memory units in an orderly sequence for either storing or retrieving temporally sequential information sets such that meaningfill sequential information is retained is encompassed by this invention.

These and other objects of the invention will be more fully understood from the following description of the invention, the referenced drawings attached hereto and the claims appended hereto.

BRIEF DESCRIPTION OF THE DRAWINGS

FIGS. 3A, 3B, 3C show three levels of electrophysiology-memory correlations:

FIG. 3A illustrates a relationship in individual subjects between amount of post-trial EEG activity in the 4–9 Hz range ("theta") and degree of retention of a 1-trial inhibitory avoidance 2 days after training. Elevated latency reflects good retention. FS: Footshock training; ECS: Electroconvulsive shock after training. (From Landfield, McGaugh and Tusa, 1972, with publisher's permission).

FIG. 3B illustrates exemplary correlation data for individual aged and young animals for which both behavioral (active avoidance) and neurophysiological frequency facilitation data were available. (Spearman rank correlation; $r_s=+0.85$) Good performance on the active avoidance (lowest numbers) is reflected by low latencies. Aged animals that were able to learn to avoid in this task exhibited stronger facilitation, which was more similar to that in young rats (From Landfield, 1988).

FIG. 3C depicts exemplary rank order scores of L-type calcium channel membrane density (8 is highest) and Morris water maze performance (8 is best), for aged animals for which scores on both variables were available. The task depends significantly on hippocampal function and is impaired with aging in F344 rats. A significant negative correlation ($r_s=0.74$, $P<0.05$, Spearman's nonparametric test) was found between maze performance and increasing channel density, indicating that channel density was highest in neurons from the most impaired animals. Dotted lines represent 95% confidence intervals. (From Thibault and Landfield, 1996.)

FIG. 4A depicts cortically-recorded, hippocampally-generated theta rhythms driven by 7.7 Hz electrical stimulation of the medial sepum (slight curvature reflects EEG pen movements). Note the highly rhythmic and coherent theta waves activated by 7.7 Hz (from Landfield, 1977).

FIG. 4B illustrates a frequency facilitation in a hippocampal slice CA1 pyramidal neuron during 7 Hz synaptic stimulation (Schaffer collaterals). Note large frequency potentiation of the EPSP above the first baseline EPSP, and the bursts of multiple $Na^+$ spikes on the EPSP peaks showing intra-burst frequencies of approximately 100 Hz. Facilitation of the EPSP occurs in the same stimulation frequency range as spontaneous or driven theta rhythms. Calibration bar applies to A and B (150 msec).

FIG. 4C illustrates single L-type $Ca^{2+}$ channel activity during and following depolarization. Expanded time scale relative to A and B. Lower trace: L-type $Ca^{2+}$ channels recorded in cell-attached mode from a cultured hippocampal neuron, activated by a 5 msec depolarization roughly mimicking an action potential. The EPSP and action potential from a slice neuron in the upper trace are included on the same time base for illustration. Note the extensive $Ca^{2+}$ channel activity that follows repolarization ("repolarization openings"), which may contribute to the $Ca^{2+}$-dependent after hyperpolarization (AHP). To approximate physiological conditions, 5 mM $Ca^{2+}$ was the charge carrier in the $Ca^{2+}$ channel recordings. (Data modified from Thibault, Porter and Landfield, 1993). The AHP can range from 100 to >500 ms, depending on number of spikes activated, and thus can contribute to theta rhythm pacing or, reduce a neuron's availability for further excitation. Calibration Bar (10 msec).

FIG. 6 is a schematic illustration of how a "rake" of multiple electrodes could be oriented along the transverse axis of the hippocampus, to monitor sequential activity traveling transversely along the Schaffer collateral fibers. LEFT: Top view of the rat brain, with the hippocampus outlined beneath the brain surface. A rake of 5 recording electrodes is shown implanted in the hippocampus. On either side, stimulating electrodes are also implanted, which are able to stimulate input fibers to the hippocampal neurons that are recorded by the rake recording electrodes. RIGHT: A transverse hippocampal brain slice dissected from the hippocampus of a rat is maintained in an oxygenated chamber. A multi-electrode rake with 5 electrodes is oriented along the transverse axis (e.g., from left to right). A stimulating electrode (not shown) can then be lowered onto fiber bands originating from the entorhinal cortex (left) or the dentate gyrus (lower right) to stimulate fibers projecting to the CA1 region neurons being recorded from by the multi-electrode rake.

FIG. 7A shows the normal patterns of neuron activity (action potential spikes) that would be recorded at each electrode on pulse 1 and on the subsequent 4 pulses. The peak activity focus shifts along the hippocampal transverse axis with each succeeding pulse.

FIG. 7B depicts a stronger pattern seen during treatment with a drug that improves temporal memory.

FIG. 7C depicts a weaker, more disorganized, and sequentially disrupted pattern seen during exposure to a toxic agent that impairs memory.

DETAILED DESCRIPTION OF THE INVENTION

I. INTRODUCTION

It has been over 20 years since it was initially proposed that synchronous electroencephalographic (EEG) rhythms such as the hippocampal theta rhythm (HTR), might function in memory deposition, consolidation and retrieval somewhat analogously to the way in which a coherent light source (laser) functions in the formation and retrieval of holograms, that is, by generating neuronal "interference patterns" (FIG. 1) (Landfield, 1976). ("Interference" used here in the optics rather than the psychophysical sense.) This interference pattern model in part grew out of work on theta rhythms and memory consolidation begun in James McGaugh's lab some time earlier (Landfield, McGaugh and Tusa, 1972). Although the intervening years have seen explosive development in the study of brain function and the cellular mechanisms of memory, a significant number of important findings over these years appear to be consistent with implicit predictions of the original model. However, when initially proposed, the interference-holographic model was somewhat limited in scope and left several important questions about its specific operations unanswered. Thus, it may be worthwhile at this point to revise and extend the model, to attempt to address some of those unresolved issues in the context of more recent work from our own and others' laboratories.

Figure 2:
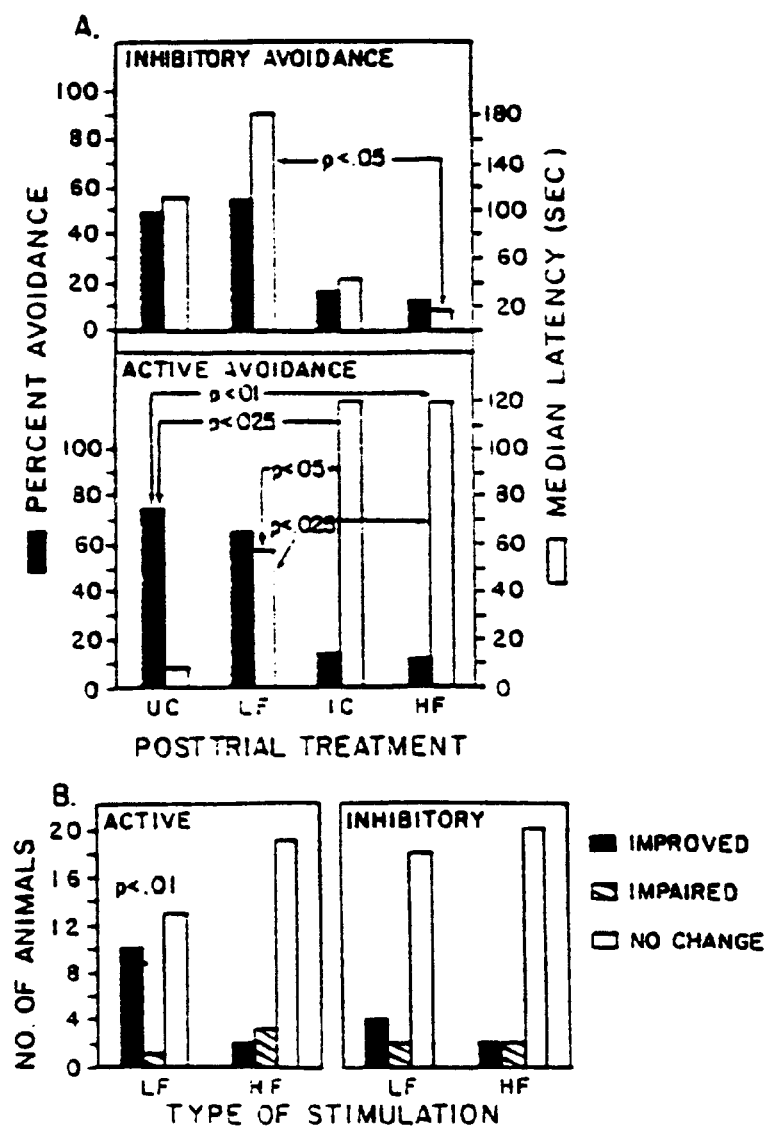
FIG. 2A illustrates effects of theta activating septal stimulation on retention performance measured 48 hr after the stimulation. Post-trial treatments: LF, low-frequency (theta-driving) post-training stimulation; HF, high-frequency (theta-blocking) post-training stimulation; IC, implanted controls; UC, unoperated controls. In the active avoidance task good retention is indicated by low latencies, whereas in the inhibitory avoidance, good retention is indicated by long latencies. Rhythmic theta driving stimulation enhanced memory relative to implanted controls.
FIG. 2B illustrates effects on retention performance of septal stimulation during testing. Shown are the number of animals exhibiting a latency change (improved or impaired) greater than 15 sec during stimulation, in comparison to latencies obtained during the prior No-Stimulation retention tests. Only the effects of LF stimulation in the active task produced a significant difference in performance compared to the No-Stimulation tests. (From Landfield, 1977).

At that time of the initial work in Jim McGaugh's lab, the post-training period was becoming well recognized as a critical phase for the study of memory consolidation processes (McGaugh, 1966). We utilized this post-training paradigm to seek EEG correlates of consolidation, and found that the amount of time occupied by EEG theta rhythm activity during the 30 min post-training period following a single avoidance training trial correlated closely across individual rats with the apparent amount of concurrent memory consolidation, as evaluated on a subsequent (48 hr) retention test (Landfield et al., 1972). In addition to these correlational results, further studies found that post-training experimental induction of hippocampal theta by 7.7 Hz medial septal stimulation (low frequency stimulation or LFS) enhanced apparent memory consolidation of both active and inhibitory avoidance tasks. LFS also facilitated retrieval when given during a retention test. In contrast, high frequency (77 Hz) septal stimulation (HFS), which blocks theta, resulted in reduced memory storage or retrieval (Landfield, 1976; 1977) (FIG. 2). Several other post-trial theta-driving studies (Wetzel, Ott and Matthies, 1977; Destrade, 1982) and septal lesion or pharmacological studies (Winson, 1978; Mitchell, Rawlins, Steward and Olton, 1982; Markowska, Olton and Givens, 1995) subsequently found very similar results on theta and memory/learning. These studies were generally consistent with the working hypothesis that synchronous EEG rhythms might reflect a neurobiological state that favored the consolidation of memory (Landfield et al., 1972).

Development of the interference-holographic model, described below, was stimulated by these results as well as by apparent similarities between optical interference patterns and neural summation, and by what seemed to be an intriguing analogy between the relative coherence (single primary frequency) of synchronous EEG rhythms and the coherence (monochromatic frequency) of the light waves (e.g., lasers) used in holography.

II. THE ORIGINAL HOLOGRAPHIC MODEL AND THE OPTICS ANALOGY

In optics, interference "fringes" or patterns are formed when two beams of the same monochromatic frequency are projected to overlap on a detector screen. These effects can also be achieved by radiating polychromatic waves from two small relatively adjacent light sources but are seen more readily with monochromatic (coherent) beams. The interference patterns consist of "stripes"of light where the waves of the two beams are in phase and stripes of darkness where they are out of phase and thereby cancel each other. In holography, a highly coherent laser beam is usually split, and divided into two beams, one of which is reflected off of an object of interest ("object beam") and one of which does not contain any information about the object ("reference" beam) but is projected to overlap and interact (interfere) with the reflected object beam to form the hologram. The essential discovery in holography was that the reflected object beam contained the information on the phase relationships among the countless smaller beams that make up the object beam and are reflected from different regions of the object (Gabor, 1972). These phase relationships encode a great deal more information on spatial relationships in detectable form than the intensity information generally obtained from light waves. The use of a second beam (reference beam) of the same coherent frequency provided a means to create interference patterns between two beams and thereby capture and record the spatial phase information in the object beam (Gabor, 1972). A photographic plate in a plane at some arbitrary distance from the object and reference beams is "etched" where the maxima of the two interfering waves are fully in phase. Thereafter, the hologram can be recreated by directing only the reference beam at the plate, because transmission of light at the wave maxima of the reference beam also recreates the object beam.

Figure 1:
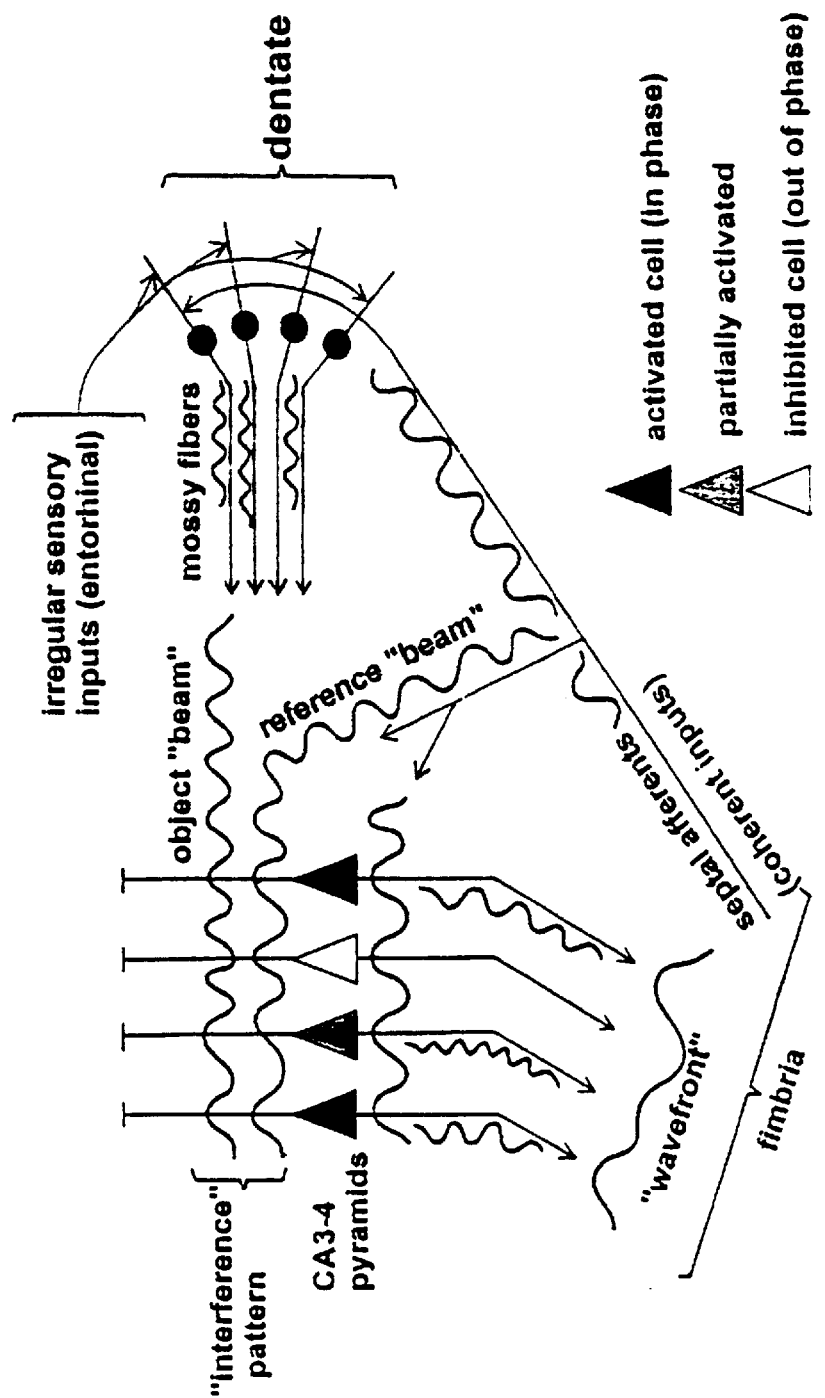
FIG. 1 depicts a hypothetical model of the manner in which the hippocampal rhythm might function in memory storage analogously to the way a laser beam (coherent wave) functions in making a hologram (see text). (From Landfield, 1976).

Analogously, in our initial conceptualization (FIG. 1), the excitatory peaks of EEG theta waves and the high frequency bursts of action potentials that are synchronized to these peaks (see below, and review, Landfield, 1976) in the dentate gyrus (DG) were viewed as similar to the maxima of the coherent waves in holography. The theta wave maxima in DG were proposed to interact (interfere) in specific granule cells with irregular, non-synchronized activity arriving over inputs from entorhinal cortex that encoded sensory or other information. These irregular inputs were viewed as analogous to the "object." Only those DG neurons in which both the (coherent) theta waves and the irregular inputs were excitatory in the same time window would generate sufficient postsynaptic summation to fire action potentials and thereby project activity over the mossy fibers to the next set of relay neurons in CA3. Multiple gradations of activity proportional to the entorhinal inputs would be present in this projected wavefront. In this way the highly variable, non-synchronized activity encoding the information patterns in a large set of entorhinal input lines would be phaselocked to coherent temporally-spaced wavefronts being projected rhythmically out of the DG, analogously to the "reflected object beam." The rhythmic, information-containing "object beam" waves would then interact (interfere) at subsequent relay neurons (e.g., CA3) with other (non-information containing) theta waves arriving over different inputs ("reference beam"). Summation and increased postsynaptic excitation (e.g., "interference patterns") would occur only in those relay neurons in which the excitatory maxima of both rhythmic waves (object and reference beams) were in phase, and those neurons activated by summation patterns would form the "hologram". Thus, only selected neurons (like the limited slits on a photographic plate where the two laser beams are in phase) would be activated sufficiently to form lasting traces ("engrams") and to project activity to other pyramidal neurons (CA1) or elsewhere (FIG. 1).

In addition, the model proposed a mechanism for consolidation that was not directly related to the optics analogy, namely, that the rhythmic high frequency spike bursts associated with theta waves subsequently circulated preferentially over (and consolidated) the recently activated pathways. Thus, these rhythmic theta bursts favored consolidation and were suggested to provide a means of "engraving" long-term changes. Of course, Hebb (1949) had much earlier proposed the concept that "reverberating circuits" could induce some growth or metabolic process that subsequently made the firing of a cell in the reverberating circuit more probable. However, EEG mechanisms were poorly understood at the time (see below), and Hebb was not in a position to directly relate his conceptual reverberating circuits to specific EEG patterns.

To account for retrieval in the model, the holographic analogy was again invoked with the suggestion that after consolidation had occurred, non-information containing coherent waves (e.g., the reference beam) could again preferentially find the previously formed traces and recreate (retrieve) the memory trace (Landfield, 1976).

III. FURTHER EVIDENCE ON THE ROLE OF SYNCHRONOUS EEG WAVES IN MEMORY

1. Cellular Mechanisms of the EEG. Although several other investigators at the time had suggested either a role for hippocampal theta rhythms in memory (Adey, 1966) or a role for neural holograms in memory (Pribram, 1971), those hypotheses did not specifically compare or relate rhythmic EEG patterns to the coherent light waves used in holograms. Moreover, those proposals did not clearly specify how either EEG patterns or brain holograms might interact functionally with brain cellular mechanisms during memory storage.

However, the possibility of developing specific models of synchronous EEG interactions with identified neural processes was becoming increasingly feasible in that period, as much was being learned about the underlying cellular mechanisms of the EEG. It had become evident that slow (e.g., synaptic) potentials were a source of most EEG waves and that as the EEG becomes more synchronous, the underlying neurons increasingly fire brief high frequency bursts of action potentials that are phase-locked to the excitatory peaks of each wave. Moreover, these waves/bursts can circulate repeatedly in multiple directions throughout local networks (Verzeano, 1970). Alternating patterns of excitation and recurrent inhibition in linked cell assemblies had been found to provide a means for generating rhythmic EEG waves (Andersen and Andersson, 1968—also see Steriade, 1994; Bal,von Krosigk and McCormick, 1994, for more recent treatments) and several studies showed that the phase of a neuron's excitatory (EPSP)-inhibitory (IPSP) cycle present at the time that new inputs arrived determined whether the new inputs summated (during the EPSP) and were transmitted or canceled (at the IPSP) and were lost (e.g., Andersen and Andersson, 1968). These new insights provided a basis not only for the interference/holographic model, but for a number of other varied hypotheses on the functions of EEG rhythms in cognitive processes (see review, Landfield, 1976) (also, see Gray and Singer, 1989; Buzsaki and Chrobak, 1995; McNaughton, 1998; Shadlen and Newsome, 1998, for recent views on the roles of neuronal oscillations).

2. Recent Findings on Theta Rhythms Relative to Implicit Predictions of the Model. An important indicator of any model's potential usefulness, of course, is its ability to generate testable predictions. Over the past years, the study of hippocampal long-term potentiation (LTP) has expanded dramatically, based on LTP's putative role as a neuronal substrate of memory. If this presumed relevance to memory is correct, then several studies linking the HTR to LTP seem highly consistent with implicit predictions of the model. For example, similar to the suggestion in the model that recurring theta bursts enhance consolidation, synaptic stimulation at theta frequencies has been found to be particularly effective in directly inducing monosynaptic LTP (Larson and Lynch, 1986; Rose and Dunwiddie, 1986), or polysynaptic LTP (Yeckel and Berger, 1998), and in inducing burst patterns (complex spikes) of postsynaptic firing that generate LTP (Thomas, Watabe, Moody, Makhinson, and O'Dell 1998). In addition, as suggested by the interference pattern component of the model, activation of neurons during the excitatory peak of the local theta wave has been found to provide maximal induction of LTP (Huerta and Lisman, 1995; Holscher, Anwyl and Rowan, 1997). Conversely, stimulation during the inhibitory phase in paired-pulse facilitation (Thiels, Barrionuevo and Berger, 1995; Doyere, Errington, Laroche and Bliss, 1996) or the negative phase of theta (Holscher et al., 1997) does not induce LTP and can actually induce depotentiation. Under physiological conditions, moreover, hippocampal neurons often fire high frequency bursts that are phase-locked to the excitatory phase of the theta wave (Stewart and Fox, 1990; Mizumori, Barnes and McNaughton, 1990; Buzsaki and Chrobak, 1995) and do so during behavioral conditions that induce LTP (Otto, Eichenbaum, Wiener and Wible, 1991).

Thus, if LTP in some way reflects a cellular manifestation of memory traces, the above results appear highly consistent with implicit or explicit predictions of the originally proposed interference/holographic model of hippocampal theta. Although many of these findings could also clearly be consistent with alternative models, the observations that recent studies do not reject the model, but rather, seem to lend it further support, suggest that updating it may be useful.

IV. HIERARCHICAL ORGANIZATION OF MEMORY-RELATED ELECTRO-PHYSIOLOGICAL SYSTEMS

As noted above, there has long been evidence that the HTR correlates with and perhaps directly contributes to memory consolidation (FIG. 3A). Further, with the increasingly reductionist direction of brain research over past years, additional electrophysiological correlates of learning have been sought at more cellular/molecular levels. Apart from the putative role of LTP alluded to above, several other electrophysiological processes have also been found in our and other studies to correlate with memory functions, as briefly outlined below.

1. Frequency Facilitation: Relevance to Memory in Aging Animals. "Frequency Potentiation" [also termed "Frequency Facilitation" (FF), the growth of synaptic potentials during repetitive synaptic stimulation, generally at 5–15 Hz] has been a major focus of our research over these years, and appears to be a particularly strong candidate for a dynamic cellular mechanism of memory deposition. Frequency potentiation is extremely prominent in the hippocampus and was first identified as a powerful hippocampal mechanism of synaptic plasticity at about the time that LTP was being discovered in the same laboratories (Andersen and Lomo, 1970; Bliss and Lomo, 1973).

Our original interest in frequency facilitation (FF) arose from early studies on hippocampal synaptic potentiation in relation to aging in rodents. In a renewed collaboration with Jim McGaugh, whose laboratory had begun to investigate memory in aging animals (Gold and McGaugh, 1975), we found that FF, even more than LTP, was impaired consistently in "memory-deficient" aged animals (Landfield, McGaugh and Lynch, 1978; Landfield and Lynch, 1977).

Based on an assumption that what is most impaired in aged, memory-deficient animals is likely to be highly relevant to memory, a long series of studies on FF was carried out (Landfield, Pitler and Applegate, 1986; see review Landfield, 1988). Those studies yielded more results consistent with the hypothesis that FF is critical to memory function, including data showing that a treatment that strengthened FF (high $Mg^{2+}$ also improved learning in aged animals (Landfield and Morgan, 1984; Landfield et al., 1986). Others have found similar evidence of impaired facilitation with aging (Ouanounou, Zhang, Charlton and Carlen, 1999) as well as evidence that age-related impairment of FF may contribute to reduced LTP (Rosenzweig, Rao, McNaughton and Barnes, 1997).

The facilitation process itself is sometimes viewed as a secondary phenomenon that arises not from specific synaptic mechanisms but from suppression of the postsynaptic GABA-dependent IPSP (McCarren and Alger, 1985). However, this possibility seems highly unlikely as FF of the EPSP is unchanged when the IPSP is blocked by bicuculline (Pitler and Landfield, 1987), and facilitation is also associated with dramatic alterations in synaptic vesicle release and recycling (Applegate and Landfield, 1988). Moreover, even if the IPSP is suppressed, it is substituted for by a major postsynaptic $Ca^{2+}$-dependent hyperpolarization (FIG. 4B and Pitler and Landfield, 1987).

Interestingly, correlation studies of learning behavior in relation to this level of electrophysiological function echoed the earlier correlational results for theta and memory. That is, a significant individual-subjects correlation was found between an aged/adult rat's capacity to learn an active avoidance task and its subsequent capacity to exhibit synaptic frequency facilitation (Landfield, 1980; 1988) (FIG. 3B).

2. Single Channel Mechanisms in Memory. At still more basic electrophysiological levels, using single channel patch clamp methods, we recently found an increased membrane density of L-type voltage-sensitive $Ca^{2+}$ channels (VSCC) in hippocampal CA1 pyramidal cells of aged rats. Somewhat remarkably, given the large discrepancies in level of biological organization, Ltype VSCC density was also significantly correlated across individual aged animals with the ability to acquire a water-maze spatial task (Thibault and Landfield, 1996 and FIG. 3C). Again, this individual-subjects correlation pattern seemed somewhat analogous to the aforementioned correlations of the HTR or FF with memory processes.

This result with L-type $Ca^{2+}$ channels was, moreover, highly consistent with other developing evidence of the potential involvement of L-VSCC in learning and memory. The $Ca^{2+}$-dependent, slow afterhyperpolarization (AHP), which is in part dependent on L-VSCC (Mazzanti, Thibault and Landfield, 1991; Moyer, Thompson, Black and Disterhoft, 1992), for example, has been found to be larger in hippocampal CA1 neurons of aged rats (Landfield and Pitler, 1984) and aged rabbits (Disterhoft, Moyer, Thompson and Kowalska, 1993). The larger AHP leads directly to greater accommodation and reduced neuronal activity during repetitive firing in neurons of aged animals (Moyer et al., 1992) and may be a factor in the beneficial effects on FF of elevated $Mg^{2+}$ or the specific L-type antagonist, nimodipine (Landfield et al., 1986; Mazzanti et al., 1991). Disterhoft and colleagues have shown that the AHP is inversely correlated with an animal's capacity to learn a conditioning task (Disterhoft, Golden, Read, Coulter and Alkon, 1988), and nimodipine enhances learning in a variety of tasks and species (see review, Disterhoft et al., 1993).

3. Hierarchical Interactions and Implications for the Model. Thus, multiple levels of electrophysiologic measures, including those obtained from large neuronal populations (EEG), from single cells (facilitation), and even from single molecules (channels), seem to correlate across individual subjects with aspects of memory/learning processes; this effect is particularly notable when amnestic influences (seizures, aging) are involved (FIG. 3A–C). Further, each of these electrophysiological processes has been found not only to be correlated with learning, but also to impact learning/memory processes during direct experimental modulation (see above).

The apparent similarities of correlation across vastly different levels of electrophysiological organization lead us to suggest that these multi-level electrophysiological processes are hierarchically linked in an integrated system that functions in signal intensification and deposition and is both critical to learning/memory and highly vulnerable to aging.

Figure 4:
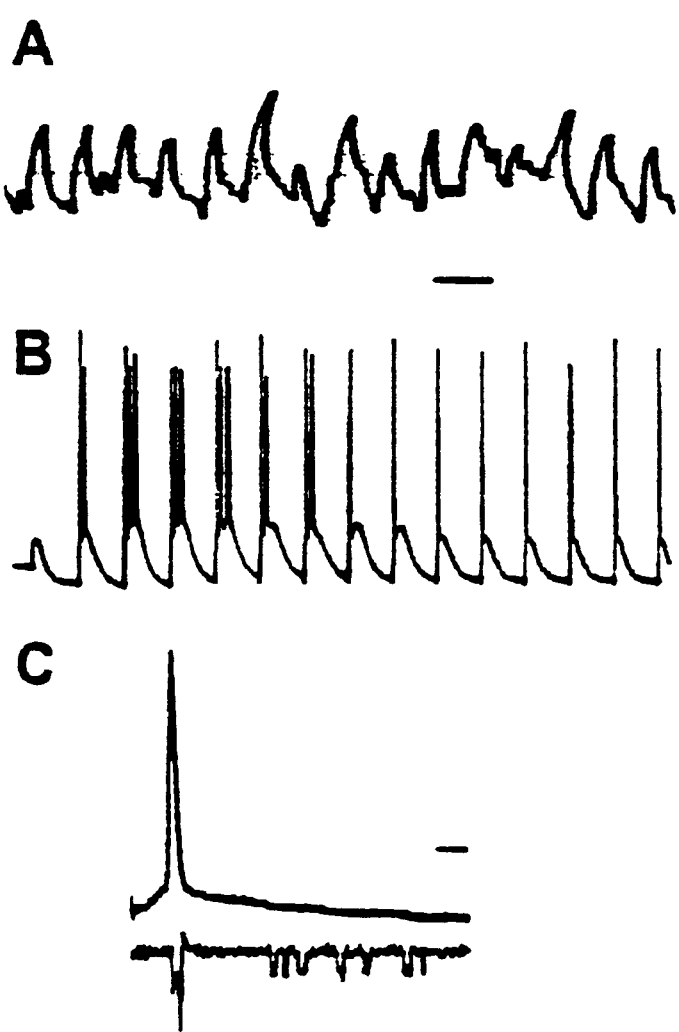
FIGS. 4A, 4B, and 4C show three levels of electrophysiological organization in the rat, corresponding to the correlates of learning and memory shown in FIGS. 3A, 3B, and 3C.

If the latter is true, then these multi-level components of the signal intensification system should be predicted to bear consistent temporal and functional relationships to each other. As seen in FIG. 4, this appears to be the case. Septal stimulation at about 7 Hz induces both EEG theta rhythms (FIG. 4A) and large facilitation of the intracellular EPSP and associated spike firing (FIG. 4B). Thus, EEG theta rhythms, which both reflect and induce the synchronous firing bursts of large arrays of neurons at frequencies of 4–11 Hz, could be a manifestation of an endogenous mechanism for inducing FF, and consequently, LTP (see Discussion, Landfield, 1977, 1988). In fact, the activation of FF by theta frequency stimulation could well be a major factor in the efficacious induction of LTP by such theta stimulation, as described earlier.

Concomitantly with the generation of action potentials, L-type VSCC are activated in each cell, both during and after a spike (Thibault, Porter and Landfield, 1993) (FIG. 4C). Recent $Ca^{2+}$ imaging studies in physiologically-monitored CA1 neurons during 7 Hz synaptic stimulation have provided direct evidence that $Ca^{2+}$ rises more in physiologically activated neurons of aged animals, and moreover suggest that part of the deficit in FF with aging may be related to this greater postsynaptic $Ca^{2+}$ influx (and likely hyperpolarization) in aged CA1 neurons (Thibault, Clodfelter and Landfield,1998). As noted above, $Ca^{2+}$ influx through L-VSCC will trigger the hyperpolarizing $K^+$ conductances underlying the AHP (Madison and Nicoll, 1984; Storm, 1990) (e.g., hyperpolarization in 4B) which in turn can reduce FF (Landfield et al., 1986), possibly decrease LTP (Barnes, 1994; Rosenzweig et al., 1997; Sah and Bekkers, 1996), alter the LTP/LTD balance (Norris, Halpain and Foster, 1998) and impair excitability and learning (Moyer et al., 1982; Disterhoft et al., 1993).

In terms of implications for the model, it seems clear that this system might subserve functioning of the model in multiple ways. Not only would the HTR provide a coherent frequency of processing that favors the periodic formation of large-scale, organized interference patterns, but the underlying facilitation mechanism at theta frequencies ensures signal intensification in the activated neurons and, therefore, more intense summation as well as greater throughput and polysynaptic impact (e.g., Yeckel and Berger, 1998). One role of VSCC and the AHP may be to pace this rhythm (see below); further, negative regulation by the AHP might prevent theta frequency from exceeding optimal ranges. Thus, the dynamic functions of this vertically-integrated electrophysiological system might be essential for the effective formation and storage of interference pattern-like representations.

V. UPDATE AND EXTENSION OF THE INTERFERENCE-HOLOGRAPHIC MODEL

1. Formerly Unresolved Questions. As noted, several important questions on the specific operation and function of the interference-holographic model were left unanswered in the original proposal (Landfield, 1976), not the least of which was how useful or valid is the optics analogy. Some of these formerly unanswered questions are summarized below:

a. In contrast to phase information in light waves, which aspects of information in neural systems would be encoded by EEG interference effects?
   b. What is the specific informational value of a coherent frequency wave in the brain?
   c. Would information be lost between wave maxima?
   d. Are interactions between two coherent wave beams required in the brain or would one interference interaction with the information patterns be sufficient?
   e. How is temporally sequential information stored?

The following responses in part attempt to address the above unresolved questions, as well as provide additional detail and extend the model in the context of the more recent findings.

2. Nature of the Information to be Stored (question a). Much information from the primary sensory and association cortical areas reaches the hippocampus through entorhinal projections into the dentate gyrus along the length of the hippocampus. This information is then projected in the transverse direction by parallel mossy fibers to CA3–4 neurons. In turn, CA3 pyramids project to CA1 pyramidal cells via boutons en passage of the Schaffer collaterals, again in a similar parallel fashion. Although many collateral and divergent pathways have since been identified (Amaral and Witter, 1989), the originally defined "trisynaptic" circuit (dentate, CA3, CA1) organized in parallel lamellae within the hippocampus (Andersen and Lomo, 1970) has long fascinated neuroscientists and continues to stimulate much speculation on its functions. Each transverse hippocampal axon can sequentially activate dozens to hundreds of neurons (and perhaps thousands when axonal divergence is considered). Further, this sequential activation can occur simultaneously in large numbers of parallel lines along the entire longitudinal extent of the hippocampus.

If we envision an activated set of fibers entering the dentate gyrus from the entorhinal cortex, simultaneously transmitting information that encodes for example, a spatially distributed visual pattern, it can be inferred that the relevant activity from the pattern at a point in time is time-locked among the entire set of activated fibers at roughly a similar distance point along the axis of travel. Moreover, the relative activity (frequency of firing) obviously would vary greatly among different fibers in the set depending on their position in the visual representation. As the visual field continuously changed over time, so too would the activity among the many fibers, still in a time-locked fashion.

Therefore, in response to question a, above, we propose that, whereas in optics the coherent laser beam encodes the phase relationships among the countless beams reflecting from different sites on the object, in the brain it is the continuously varying simultaneous activity relationships among the thousands of activated axons in the pattern set projecting into the hippocampus that must be encoded.

3. An Essential Assumption for the Model. One simple but nevertheless fundamental assumption greatly aids in addressing the other questions: It is assumed for the purposes of this model that, despite its billions of neurons and trillions of synapses, the brain's elements do not begin to approach the information storage capacity required to store the vast amounts of information that it constantly processes. As a corollary, one of the major finctions of interference patterns and coherent rhythms in memory are proposed to be to sample continuous information patterns, both temporally and spatially, in order to greatly condense the amount of information to be stored.

We suggest that the HTR "temporally chunks" the continuous stream of relative activity relationships by periodic sampling at the frequency of theta, and time locks each sample to an EEG wave that travels transversely across the hippocampus from dentate to CA1 as a longitudinally-extended wavefront. If each theta wave peak provides a "window of excitation" of approximately 25–50 ms during which interactions with another input are enabled, then all digital bits (spikes) arriving over the informational input during one temporal window (theta wave excitatory phase) would be converted into a single bit of integrated information (e.g., the summed EPSP). Thus, a hundred or more digital bits of information per second (100 Hz spike activity), could be condensed to approximately 7 bits (waves per sec). Clearly, this view also implies that, because of the surfeit of information in the brain, sampling with 25–50 ms windows at 7 Hz is sufficient to capture the activity relationships among activated inputs; in this view, loss of information between wave maxima (question c) may not only be acceptable, but in fact essential for "noise" reduction.

Interference/summation effects are also suggested in part to fulfill a sampling function. In the model, because of the damping effect of the digital-to-analog conversion in dendrites, activation is limited to those encoding cells in which multiple postsynaptic inputs (at least one of which is a theta peak) arrive in roughly the same time window. Cells activated by one input without intense activity in the other input will not be excited above threshold sufficiently to fire proportionally to the input activity. The interference pattern method of encoding (summation of roughly simultaneous excitatory inputs), therefore, appears to provide a key quantitative filter mechanism for limiting the number of cells that transmit information at incremental relay steps in trace formation (i.e., to only the cells activated most intensely by two inputs). If these are also the neurons in which lasting traces are formed, then this process clearly would limit the number of "bits" to be stored. As with holograms, the clarity of the pattern can be enhanced and fewer elements are needed for storage by increasing frequency coherence of the waves (questions b and d).

c. The Problem of Encoding and Storage of Sequential Information. The problem of how time and sequence are encoded in the brain (question e) of course involves many highly complex issues that have been addressed in several models (e.g., Gray and Singer, 1989; Churchland and Sejnowski, 1992; Buzsaki and Chrobak, 1995; Kristan, 1998; McNaughton, 1998; Shadlen and Newsome, 1998). However, the related problem of how sequential information is saved in long-term storage may be even more complex, given the potential for confounding by overlap or cumulative activation of the same neurons. Some models have proposed mechanisms through which the CNS could prevent confounding by inhibiting the activation of already stored patterns during acquisition of new traces (e.g., Hasselmo and Bower, 1993). Although a process like this clearly seems necessary, the prevention of overlap and confounding among continuously arriving, differentially time-tagged information patterns represents a separate and additional formidable problem with which the CNS must cope.

Because of the apparent difficulty in maintaining temporal "tagging" of separate postsynaptic sites, (i.e., all sites seem to be integrated depending on electrotonic distance) we assume here that different time-tagged patterns are stored in different spatially-distinct neuronal arrays (although a single neuron presumably can participate in multiple arrays). We also suggest that the sequential activation of multiple neurons by boutons en passage along the long transverse projections of the trisynaptic circuit is critical to the distribution of temporally distinct information in different neuronal arrays. Further, a certain amount of temporal spacing between time-tagged patterns is proposed as essential for their orderly distribution in sequential arrays. In the model, it is proposed that the distribution of sequential time-tagged patterns occurs sequentially into spatially ordered and relatively adjacent arrays, and is accomplished by a combination of AHP-induced silent periods in a recently excited array and by an incrementally shifting peak phase of the theta rhythm along the transverse direction. Thus, sequential wavefronts would be stored in adjacent arrays because an incremental shift of the peak of theta along the temporal (transverse) axis would be temporally synchronized such that it would enable only the next adjacent spatial array to be activated by the next succeeding wavefront arriving over the Schaffer collaterals from the dentate. These operations are outlined below and in FIG. 5.

VI. OPERATION OF THE UPDATED MODEL

Figure 5:
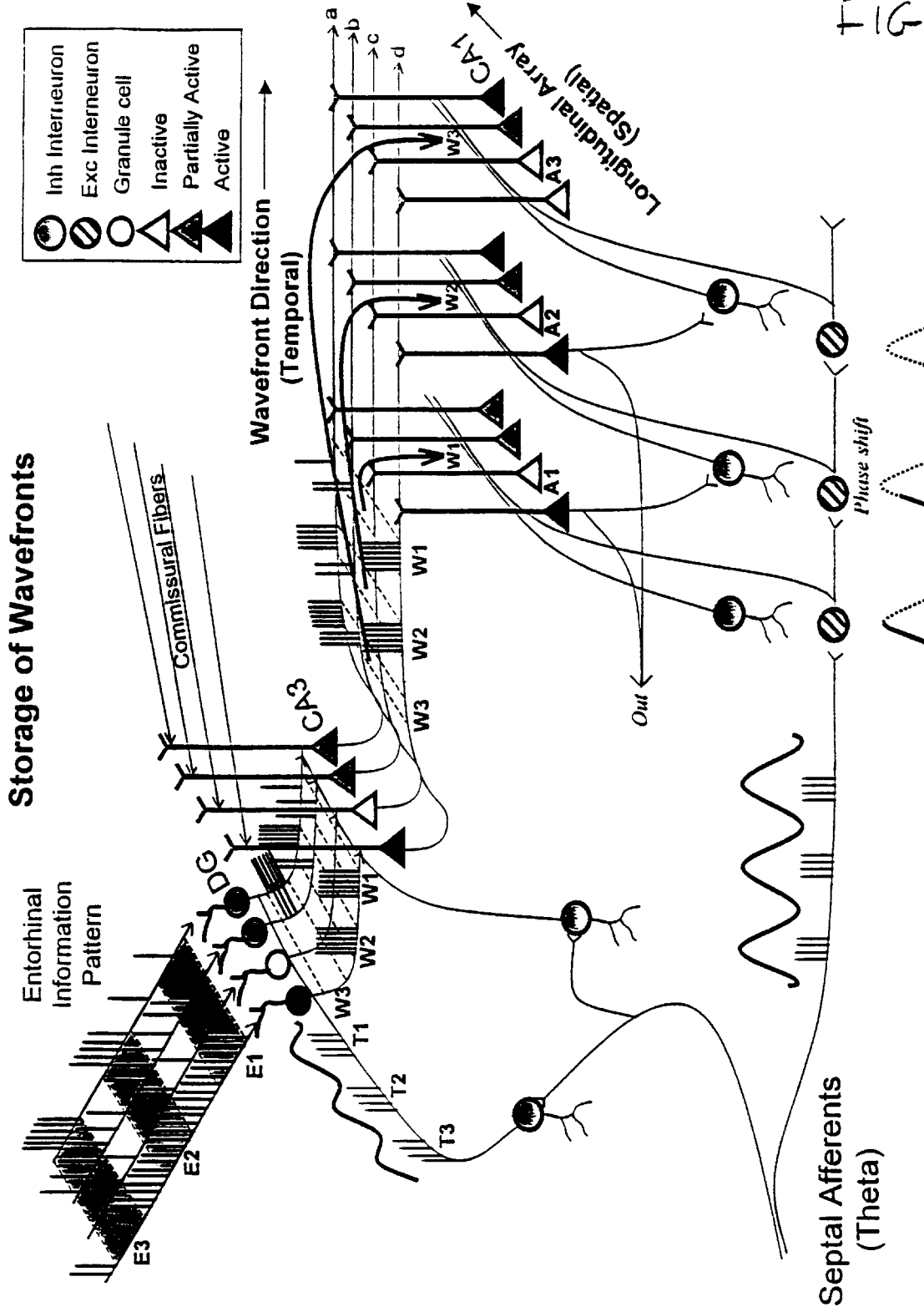
FIG. 5 depicts an updated version of the interference pattern/holographic model of memory trace formation. This version shows in more detail how variable information-encoding firing patterns in entorhinal afferents (the object) would be temporallv sampled by summation with the theta rhythm in the dentate gyrus (DG) and converted into coherent waves (theta) projected from the DG to CA3 at the theta frequency (reflected object beam). Theta bursts T1,T2, T3 moving to the DG, and the entorhinal fiber activity episodes E1, E2, E3 (shaded), represent neural activities of two inputs that will arrive at the DG granule cells in corresponding time windows (e.g., T1 with E1, T2 with E2, etc.). W1, W2 and W3 represent the encoded theta frequency wavefronts that will emerge from the DG as a consequence of the interference (summation) interactions in DG between the simultaneous inputs (i.e., W1 resulting from T1 and E1 interactions, etc.). The patterned shading of DG and CA3 neurons reflects the activity pattern generated by only the first encoded wavefront (W1). Note that each emerging wavefront will exhibit varied patterns of activity across the multiple DG output cell fibers, which will be proportional to the relative activities of the entorhinal input fibers at the time of sampling and summation/interference in appropriate DG neurons. The emerging wavefronts only transmit quantitative information about the levels of relative activity sampled during the brief (e.g., 25–50 ms) time windows at the excitatory phases of each theta wave. Although similar modulation likely occurs in the CA3 region (e.g., by commissural or other inputs), this is not illustrated here for simplicity, and W1 is shown passing through CA3 unaltered. In CA1, a possible mechanism for storing temporally ordered information in spatially distinct and sequential arrays is shown. As each information-containing wavefront (object beam) arrives in CA1 it will activate (and be encoded in) only the limited neural array that is simultaneously activated by the peak of the excitatory phase of the CA1 theta rhythm (reference beam). The schematic diagram illustrates the first wavefront (W1) activating and being encoded in the first neural array (A1) in which the CA1 theta excitatory phase is simultaneously maximal when W1 arrives. Subsequent arrays are not available for W1 because they have not yet reached the peak of theta activation (due possibly to synaptic delays in chains of interneurons). However, as W2 arrives in CA1, the neurons in A1 are no longer available for excitation because they are inhibited by long AHPs and/or recurrent IPSPs. Further, resetting of the theta frequency in A2 by activation of A2 inhibitory neurons by A1 pyramidal neurons ensures that the peak of theta in A2 coincides with the arrival of A2. Thus, W2 can activate A2 neurons and be encoded in A2. A similar set of conditions and additional peak phase shift induces the information patterns of W3 to most strongly activate neurons of A3. Longitudinally projecting inhibitory interneurons maintain synchrony of theta in each array, but are slightly out of phase with other inhibitory interneurons controlling more lateral arrays along the transverse axis. Note that the information dimension of the wavefront, which encodes relative activity, is envisioned to extend longitudinally in the hippocampus, whereas the time dimension (direction of wave travel) is proposed to extend in the transverse plane (along the tri-synaptic circuit). Therefore, different time-slice wavefronts will be stored in different sequential arrays along the transverse plane. An array might vary in width along this plane from a few to dozens or hundreds of neurons. Along the longitudinal extent, however, many thousands or more of neurons could participate in a wavefront array.
Figure 7:
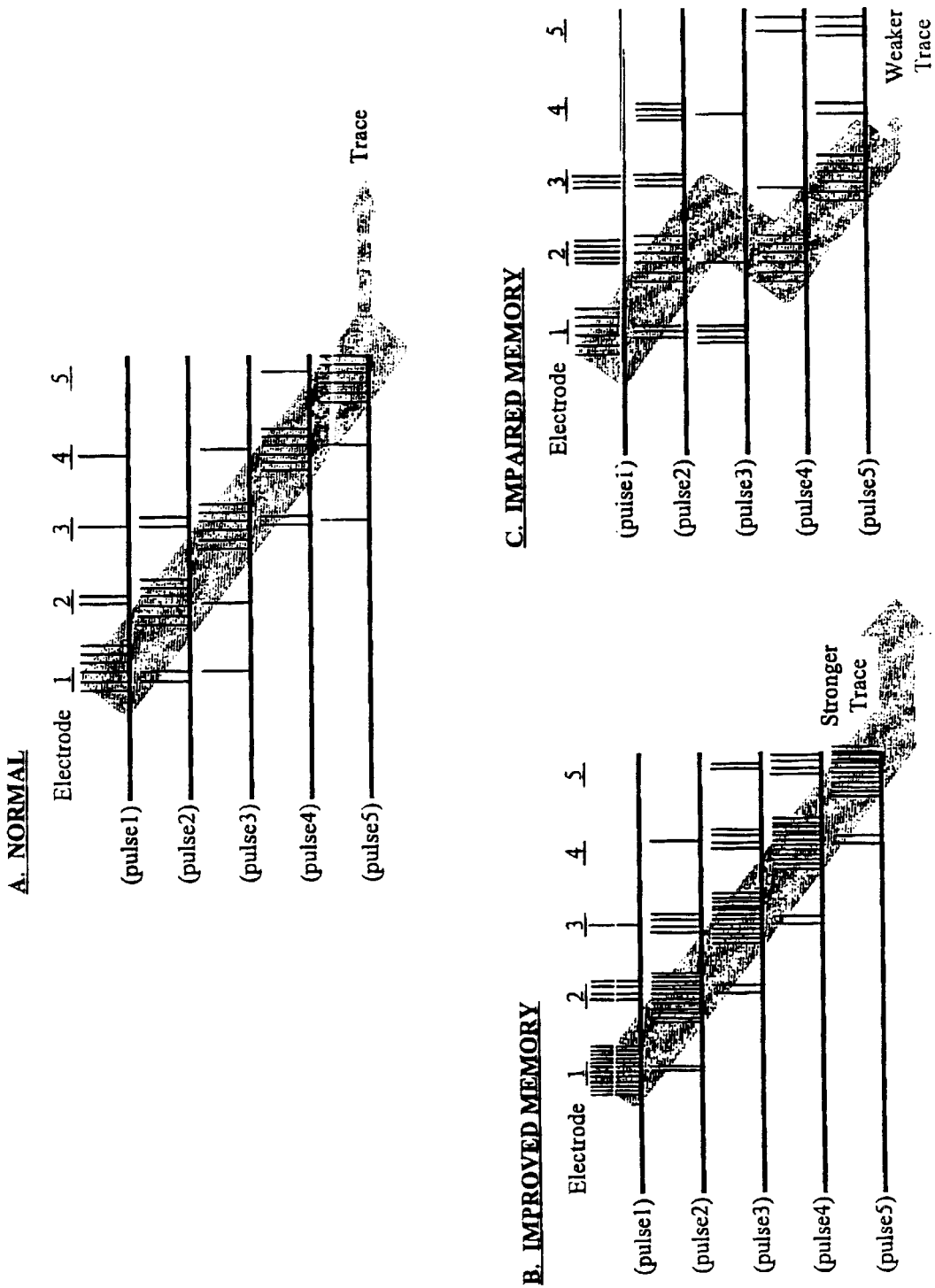
FIGS. 7A, 7B, and 7C are a schematic diagrams illustrating the kinds of recordings that are obtained in the examples from the 5 electrodes shown in FIG. 6, during a series of five repetitive stimulation pulses from one of the stimulation electrodes.

1. Memory Trace Formation and Deposition. As seen in FIG. 5, highly unsynchronized information-containing activity continuously arrives from entorhinal cortex via numerous input fibers. The activity varies substantially in different fibers. At the dentate gyrus (DG) this information activity pattern (the "object" in the optics analogy) is sampled and time-locked to the theta wave peak by summation interactions with theta waves. Because the theta wave activation will be generally comparable in all DG neurons, the degree of activation in individual neurons will be proportional to the degree of activity in entorhinal input fibers. The projections of sequential temporal information samples out of DG to CA3 therefore are at theta frequency ("reflected object beam"). While less total information than originally received is transmitted in these samples, the range of relative activity across the multiple parallel input fibers is still encoded by different relative intensities of the theta bursts projected from each DG neuron.

It seems feasible that additional stages of such informational interactions could occur at successive relay neurons of a traveling wavefront. In FIG. 5 this is implied for CA3 (e.g., commissural fibers) but the type of interaction is not specified and, for simplicity, wavefront 1 (W1) is shown transmitted without modification.

In CA1, at the transverse point (e.g., array A1) where this first wavefront (W1) meets and summates with the excitatory peak of a non-information containing second coherent theta wave ("reference beam") arriving over other inputs, only those axons transmitting maximal intensities (frequencies) in W1 will be able to summate with the theta peaks and activate target neurons in array A1.

Ordered deposition of sequential Ws, in this view, is governed by a timed interplay between the frequency of arriving Ws (time-slice patterns) and the incremental phase-shifting of (enabling) theta wave peaks along the direction of wavefront travel. In our model, this phase shift is timed by "re-setting" of the theta frequency such that it peaks in the adjacent array when the next wavefront arrives. This is accomplished by activation of inhibitory interneurons of A2 by collaterals of the activated A1 pyramidal neurons; this begins a long IPSP in A2 neurons from which they will rebound just as W2 arrives. Moreover, AHPs and/or IPSPs in recently-excited arrays function to further prevent deposition of new interference patterns in recently activated neurons. Simultaneous control of each array could be accomplished by longitudinally oriented interneurons (Buckmaster and Schwartzkroin, 1995) each synchronizing a large array (Buzsaki and Chrobak, 1995) and each slightly out of phase (due to synaptic delays in transversely-oriented chains of excitatory interneurons, for example) with adjacent interneurons regulating other arrays. Theta has long been recognized to be approximately 180 out of phase between DG and CA1 (Bland, Andersen, and Gates, 1975), and there is some evidence that the phase of theta may also shift further along the transverse axis of the hippocampus (Bullock, Buszaki and McClune, 1990). FIG. 5 (see legend) shows three sequential Ws deposited in three sequential arrays (each array being longitudinally extended, but limited in the transverse axis). Memory consolidation would occur in this revised model much as it did in the original (e.g., by circulating bursts at theta frequency). Retrieval, however, would likely require some focusing/associative mechanism in order to trigger the re-creation of the original sequence from the beginning array.

The above schema is simplified for purposes of explanation and non-exclusive. Other possible circuitry mechanisms could of course be conceived for ensuring that adjacent arrays are sequentially enabled simultaneously with the arrival of the next sequential information wavefront. However, the essential element of the model is the sequential enablement of succeeding arrays in an orderly spatial pattern.

VII. PHYSIOLOGICAL METHODS FOR TESTING EFFECTS OF AGENTS ON TEMPORAL MEMORY

Based on the basic principles of the invention described herein, one schooled in the art could readily conceive of tests in animals, animal tissues or humans that would allow use of the invention to test new compounds, physiological conditions or interventions of any kind for an effect on temporal memory processes. For example, the neuroholographic model proposes that different arrays of neurons in the hippocampus will be activated in sequence by sequential waves or bursts of neural activity, and that such sequential activation corresponds to the conversion of temporally sequential information into anatomically distributed information for subsequent orderly recall.

Therefore, an experienced researcher could use an array of multiple electrodes arranged, for example, as the teeth of a rake, a 2-dimensional square matrix, or in some related arrangement, suited to monitor the transmission of neural activity through the known anatomy of a specific brain structure. The researcher could record the neural activity simultaneously at all the electrodes, store these data, and then assess the sequence and pattern of activity at each electrode. The neuroholographic model predicts that during repetitive activation of the underlying neurons (whether by spontaneously generated activity or experimentally-induced activation), greater neural activity should be generated at one (or one subset) of the array of electrodes, in comparison to the other electrodes, by the first stimulus pulse or pulses.

Subsequent pulses, however, should generate greater neural activity at a different subset of electrodes, in an orderly manner. And pulses after that should generate the greatest activity at still another subset of electrodes. The pattern of shifting foci of activity with subsequent bursts, is consistent and measurable, and therefore, a researcher would readily be able to determine whether any experimental intervention, condition or disease impaired or enhanced the sequence rate, amplitude or distribution of the activity patterns as they reached each of the various electrodes.

In one example, a researcher studies an animal that has a "rake" array of 5 microelectrodes implanted in the hippocampus, with the rake oriented longitudinally along the hippocampal transverse axis. Each electrode is connected to an isolated wire that goes to a connector unit cemented to the animal's skull (FIG. 6). These assemblies are well known in neuroscience research. The researcher then induces repetitive bursts of activity (e.g., of 4–15 Hz) in the animal's hippocampus, either with a stimulating electrode located on fibers of a hippocampal input pathway, or by arousing the animal and thereby inducing spontaneous rhythmic activity. The researcher then records and stores in a computer the activity pattern at all five electrodes during the first burst, the second burst, the third burst, and so on. The researcher then quantifies the profile of activity at all five electrodes during each sequential burst, and notes where the peak activity was on each burst, how intense and large the amplitude of the activity pattern was, how rapidly it traveled and/or decayed between the different electrodes, and whether it reflected an orderly sequential pattern during multiple tests (along with other measures).

The researcher then gives an experimental drug to the animal that may improve memory and runs the same experiment again. Now the researcher observes that the sequence of activity is similar, but there is a larger burst of activity at each electrode in sequence, and there is less extraneous activity (i.e., greater contrast between electrodes).

Then, the researcher waits for the animal to recover and gives it a dose of pesticide that is thought to have toxic neural effects. The researcher performs the same experiment and observes that now, the peak activity at each electrode is diminished, the activity peak at one or one set of electrodes occurs in a different sequence than it did before, and there is not as large a difference between the electrodes during each burst as there was before the pesticide was given. Moreover, on repeated tests of five pulses each, the sequence is less consistent than under control conditions.

The researcher concludes that the first drug should improve temporal memory in animals because it enhanced the normal properties of the shifting activity focus system, e.g., by enhancing the intensity of bursts and the distinction between different electrodes, or increasing the rate of activity travel through the electrode array and enhancing sequence consistency. The researcher therefore proceeds to test the drug in animal behavioral tests to determine whether it enhances learning and memory in animal models, with the goal of eventually developing a new drug for beneficial use in humans.

On the other hand, the researcher also concludes that the pesticide may have pathological actions on human temporal memory and cognition because it disrupts the normally orderly sequential patterns, adds inconsistency, reduces the distinction between activity bursts at various electrodes and/or reduces the intensity of each burst. Therefore, the pesticide is recommended for an extensive series of behavioral tests to identify its toxic consequences.

The invention has utility because it allows for rapid screening of compounds or other treatments without cumbersome and prolonged behavioral testing. It also has utility over other recording methods because it relies on predictable sequential patterns at multiple electrodes, and is therefore able to detect very subtle differences. The difference between this and other recording tests that use multiple electrodes, is that here the relationship between activity at each electrode shifts in a consistent fashion with each subsequent pulse or set of pulses. Therefore, the new method tests a specific cognitive function that is critical to human memory: the ability to store temporal patterns that vary over the period of a few seconds (e.g., the multiple syllables of a long word, recall of the sequential visual pattern associated with a rapid active event, such as a sports play, an accident, or the direction in which a vehicle turned). Thus, the described testing system based on the invention would be uniquely specialized to test brain functions that are essential to discrete, complex, sequential memories, as opposed to simpler, more ingrained functions (e.g., recall of one's name). It is known that complex, specific-event memories are those most vulnerable to memory impairment from Alzheimer's disease, many forms of brain damage, aging, etc. Therefore, being able to screen specifically for actions of drugs or other treatments on those types of memories would be of substantial importance in developing new therapies or detecting toxic agents.

Although rapid sequences (e.g., seconds) and multiple electrode test systems are preferred examples, longer and slower sequences (minutes to hours) may reflect the "stringing" together of multiple smaller sequences using similar principles, and would be a variation of the invention. Also, tests based on the principles of this system that used sequential patterns at a single electrode could also readily be envisioned from the invention.

VIII. BEHAVIORAL TESTING FOR TEMPORAL MEMORY

Electrophysiological or other forms of physiological monitoring can be used effectively to screen large numbers of compounds. However, another preferred use of the invention would be to test animals or humans in behavioral tasks that require the ability to remember and recognize a temporal sequence of events, for example, a string of sound patterns (new syllables) or a series of visual patterns. The ability to recall a rapid sequence accurately would selectively test the same system of temporal sequential memory as the physiological tests noted above. Therefore, such behavioral tests could be used in conjunction with the 10 physiological tests or alone, to probe effects of treatments on complex, sequential memory capacity.

In one example, a researcher trains a rat to press a lever for food only after the rat hears a specific series of 5 tones within a 3-second period. The researcher then introduces a sequence in which several of the 5 tones are at different frequencies. The rat is trained to press the lever only if it hears the precise new sequence of tones. Then, the researcher administers a compound to the rat and tests whether the compound facilitates or impairs the rat's recognition of the previously-learned tone sequences, or affects its ability to learn new tone sequences. The same training and testing principles is also applied to a series of visual stimuli (light patterns) or motor behavior sequences (learning a complex series of turns or lever presses in a short period).

This revisiting of the model, and the added detail and extension to new questions, has resulted in the apparent emergence of new principles and functions of the possible operations of an interference pattern/coherent rhythm mechanism.

In particular, three main functions in memory formation and storage appear to be clarified by the further development of the model. Two of these are extensions of the original model and the third is new to this version. (i) Sampling Function. The model clarifies the sampling function through which continuous streams of information over primary informational inputs (sensory, associational, internal) are sampled by EEG waves and converted into a rhythmic output of temporal samples (The "Holographic" Analogy). (ii) Temporal Coherence Function. The model incorporates a mechanism for temporally synchronizing two inputs to some of the same neurons, thereby selectively activating only those neurons in which input summation occurs (The "Interference Pattern" Analogy). (iii) Temporal Storage and Retrieval Function. The primary new component of the extended model is a proposed process for the sequential storage of temporally ordered information waves in spatially adjacent neuronal arrays. This process depends on mechanisms and circuitry that produce a steadily incrementing shift in the spatial location at which synchronized inputs occur. Retrieval depends on reactivation of the arrays in spatial order. Together, these mechanisms and functions appear to provide a means for repackaging continuous and overwhelming information into more manageable quantities and for the temporal spacing needed for orderly spatial distribution and long-term storage of different time-slice patterns. The anatomy of the hippocampus seems well-suited for this function, but similar principles could well operate in a number of brain regions laid out in similar fashion (e.g., the cerebellum).

A hierarchically-integrated electrophysiological system, comprising theta rhythms and synaptic frequency facilitation, which may be optimized at frequencies regulated by L-$Ca^{2+}$ channel-dependent AHPs, appears to function to ensure signal intensification, maximal activation and throughput in circuits activated at theta frequencies. Such maximal activation would clearly enhance summation effects and trace deposition. Moreover, this system appears highly vulnerable to the effects of aging and, in the context of the model, its impaired function (e.g., in aging), should result in weaker neuronal interference patterns, reduced consolidation and possibly, impaired retrieval.

Theta rhythms are recognized to be less prominent in humans and monkeys (Stewart and Fox, 1990). Rodents depend extensively on information acquired by sniffing at theta frequencies and the prominent theta rhythm therefore could reflect a species-related mechanism for synchronizing the acquisition and the processing of sensory information. In primates, acquisition of sensory information at different frequencies may reduce the need for theta, or a larger brain with more complex and non-synchronized dipoles might reduce the detection of theta. Coherent waves at substantially higher frequencies can also be phase-locked throughout the brain (e.g., Gray and Singer,1989; Buzsaki and Chrobak, 1995) and could play a more significant role in primates. Some preliminary evidence suggests that the AHP may be briefer in monkey brain cells (Aou, Oomura, Woody and Nishino, 1988) perhaps consistent with the view that higher frequencies of processing are favored. Further, many of the specific anatomical details or timing mechanisms proposed here are of course highly speculative.

Nevertheless, the prominence of the HTR in rodent hippocampus, and its association with memory and LTP, seems to make it an excellent synchronous EEG pattern with which to study and model underlying principles of summation and coherent brain activity in memory. Presumably, if the model is valid for rodent hippocampus, its basic principles will be generalizable, with selected modifications, to information processing and storage in other brain structures and species.

A novel method is proposed herein for storing temporally sequential information in an array of fixed interconnected memory storage units (neurons), such that different sets of sequential information can be stored in separate sub-arrays of storage units in a spatially organized "chain-link" manner. The information could later be recreated in the same temporal sequence simply by activating the different spatial locations (sub-arrays) in the same or similar sequence in which the information was initially stored. A prime example of this method would be storage of the first temporal set of information in the first sub-array of neurons or storage units along an information pathway and the subsequent storage of the next sequential information set in the next adjacent sub-array of neurons/storage units, followed by storage of the third set of information in the next adjacent sub-array after the second sub-array, and so on. The temporal series could then be recreated or recalled in sequence at a later time by activating the multiple storage arrays in the same predetermined sequence in which they originally received the sets of information for storage (i.e., first sub-array, second sub-array, third sub-array, etc.).

There are three main differences between the temporal memory system and prior neural network models of brain function or artificial storage systems: 1) In this present model, information is divided by temporal sequence into "time slices" or waves of information which are each stored in a distinct and separate array, within a sequence of arrays, in an ordered fashion. The order of storage in sub-arrays is regulated by the system's connections and the direction of information flow in the system; 2) Specific arrays become available in sequence for storing each sequential information set based on a spatially moving process of "enablement" that makes distinct arrays available or accessible sequentially, such that each information-time slice can be stored only in the restricted array that is enabled in sequence; and 3) Interconnections among the arrays ensure that the information sequence can be recalled in the same sequence at a later date, by simply activating the initial array or a few initial arrays, because the interconnections among sub-arrays will then automatically activate the later arrays in the original direction of information travel (sequence).

The basic principle of the original holographic model (Landfield, 1976) is that information is stored only in neurons that are activated above a certain threshold; reaching this threshold usually requires summation of excitatory inputs into the neuron from at least two pathways. However, the basic principle underlying storage of this kind of information in its temporal sequence, which is the new part of the model that has not been previously disclosed, is that excitation from one input pathway is shifted spatially in a systematic incremental pattern, controlled by intrarray hard-wired circuitry and activity patterns, along the axis of information travel in the second input. When the information arrives along the 2nd input, summation is only possible in the restricted sub-array being activated by the shifting excitation of the first input pathway. By systematically shifting the peak of excitation along an established pathway of information travel, it is thereby assured that a new sub-array will be made available for summation as the next set of information arrives. Since the systematic shifting will occur in a repeatable and predictable manner based on internal circuitry and properties of the neurons, sequential information patterns will be laid down in automatically retrievable spatial patterns, with no need for independent encoding of temporal information. Thus, a temporal sequence could be recalled (retrieved) in proper order simply by again activating the multiple sub-arrays in the same circuitry-dependent sequential pattern.

In our model, we have proposed specific neural circuitry and mechanisms that could systematically shift a focus of excitation along a spatial axis. The model also includes mechanisms for protecting (making unavailable) a sub-array that has already received a set of information from the interfering effects of receiving a second set before the memory has been stabilized. However, it is likely that many alternative circuits or networks could achieve essentially similar outcomes. The main aspect of the invention, therefore, is the principle of converting temporal sequential information sets into corresponding spatially distributed fixed sub-arrays of storage units. Retrieval of the temporal sequence would be achieved simply by recreating the process of sequential activation that was used when the memory trace was originally stored.

A method is described herein for testing the effects of drugs or other treatments on complex biological memory systems that is based on this model. The method would use techniques for monitoring neural function (e.g., multiple recording electrodes) to determine whether a drug or treatment improves or impairs the system's ability to store or retrieve sequential memories. This could be done by testing predicted properties of this model during drug exposure. For example, an investigator could generate sequential activity in the system with an electrical stimulating electrode at a preferred processing frequency for that system (e.g., 7 pulses/sec, or 7 Hz). The model predicts that repetitive waves of activity are critical to temporal storage and therefore, recording electrodes would monitor whether that frequency of activity was faithfully transmitted through the neural tissue in the presence of the drug or other treatment under study, in a manner similar to transmission in the absence of the drug or treatment (i.e., in control tissues). Other examples include but are not limited to monitoring whether the amplitude of waves increased or decreased during transmission through the neural relays of the system or whether different regions (arrays) become sequentially more active, accessible or excitable, as predicted if they systematically vary in their availability for storing sequential time slices of information.

This monitoring method could be used either in drug discovery to screen for and identify drugs that improve human memory, or in toxicity studies to identify poisonous or toxic substances that impair cognitive functions. For example, a larger burst of activity or a more coherent activity with respect to the non-dosed state may indicate a cognition enhancing activity of the drug or treatment. On the other hand, a diminished state of activity or less coherent activity as compared with the non-dosed state may indicate a neurotoxic effect of the drug or treatment. Methods for analyzing cellular and molecular mechanisms or changes associated with memory, or methods to find therapeutic methods for counteracting toxic effects, are also included as preferred embodiments of the present invention.

The neural systems used to monitor sequential processing could be in vivo animal models bearing multiple recording electrodes, in vitro culture or brain slice or organotypic slice preparations, or could also include hybrid biological-electronic systems able to monitor responses of biological tissues, to name some potential applications.

Any electronic, computer, magnetic or even mechanical device that utilized the temporal storage principles of the invention as outlined above is within the scope of the present invention. For example, computers now use "random access" memory. However, if a computer were constructed to store memory in a defined spatial array pattern that corresponded in a predetermined manner to the temporal sequence in which information was received by the device, especially for purposes of facilitating the recall of that same sequence at a later time, is considered to be a preferred embodiment of the present invention.

Artificial intelligence devices, whether for entertainment, research or instrument control, that were designed to exhibit temporal learning, and that used the principle of converting time (sequence) into predetermined space (connected storage arrays) are considered to fall within the scope of the present invention.

Devices that stored memories in a pattern of spatial arrays predetermined by circuitry and/or a moving focus of enablement (e.g., either an electrical bias to assist an array in reaching a threshold, a magnetic field directed only to the targeted arrays, or some electronic switching mechanism to an array accessible to new information, to name only some of the possible strategies for producing a mechanism of "moving enablement" of different arrays in a patterned sequence) would have a major advantage over current memory devices because a central processor or retrieval mechanism would not be needed to read or interpret date codes in order to retrieve a temporal memory in sequential order. Instead, the memory processor could simply run through a known spatial pattern of (e.g., adjacent) arrays and recreate the original temporal sequence. An alternative version of this retrieval system would be a memory processor that only had to locate and activate the first (or first few) arrays in the sequence and then the remaining sequence of sub-arrays in the temporal memory set would automatically be activated in proper sequence, based on the internal circuitry among the sub-arrays (e.g., sub-array 1 activates sub-array 2 which activates sub-array 3, and so on).

Figure 8:
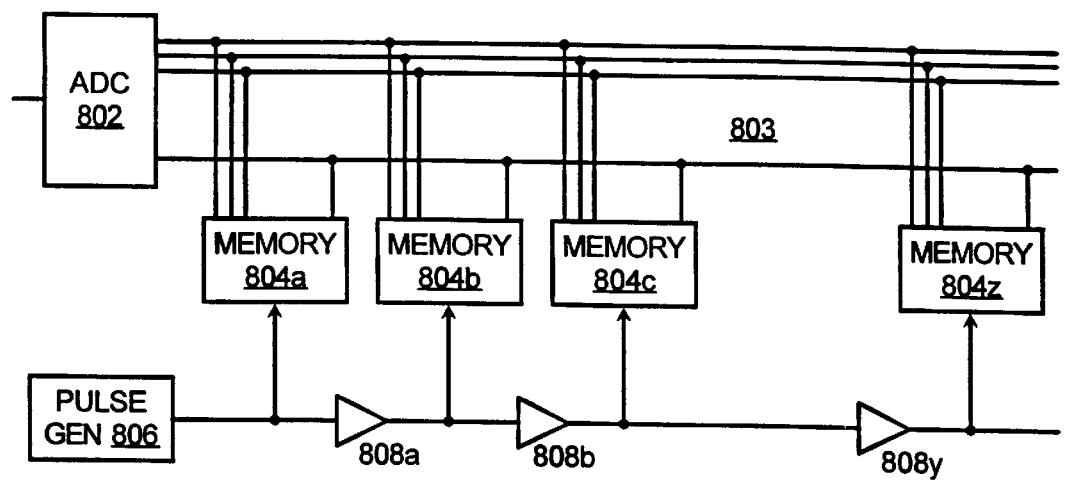
FIG. 8 depicts an embodiment of the present invention for storing temporally sequential information as implemented with semiconductor memory circuits.

FIG. 8 depicts an embodiment of the present invention for storing temporally sequential information as implemented with semiconductor memory circuits. When the temporally sequential information is in analog form, an analog incoming signal is applied to an analog-to-digital converter 802 to digitize the incoming signal into one or more bits that that represent the temporally sequential information. The digitized bits are applied in parallel to a data bus 803 comprising lines that correspond to each bit. Alternatively, if the temporally sequential information is already in digital form, then the analog-to-digital converter 802 may be omitted and the digital temporally sequential information is placed directly on the data bus 803. The number of parallel lines will depend on the precision desired for the implementation, e.g. 8-bit data, 16-bit data, or 32-bit data.

Each line of the data bus 803 is coupled to a corresponding input of a semiconductor memory device 804*a*, 804*b*, 804*c*, . . . , 804*z*. As the digitized temporally sequential information placed on the data bus 803 varies over time, the data bus 803 simultaneously presents the time-varying information to the semiconductor memory devices 804*a*, 804*b*, 804*c*, . . . , 804*z*, which can be a latch, a register, a static random-access memory (SRAM), a dynamic random-access memory (DRAM), a flash electrically erasable programmable read-only-memory (FLASH EEPROM), neural network, or other such memory. Each semiconductor memory device 804*a*, 804*b*, 804*c*, . . . , 804*z* is configured to latch or otherwise store the data presented at its input in response to an electrical signal such as a clock signal or an enable signal being applied to its control input.

The signal to control the semiconductor memory devices 804*a*, 804*b*, 804*c*, 804*z* is ultimately produced by a pulse generator 808, which is configured to generate a pulse of a prespecified duration, e.g. 100 ns, and apply the pulse to a chain of serially coupled delay elements 808a, 808b, . . . 808y, such as an inverter chain. Furthermore, control inputs of the semiconductor memory devices 804a, 804b, 804c, . . . , 804z are coupled to an input or output of corresponding delay elements 808a, 808b, . . . 808y. As the pulse generated by the pulse generator 806 travels down the chain of serially coupled delay elements 808a, 808b, . . . 808y, the pulse is successively delayed and applied to the control inputs of adjacent semiconductor memory devices 804a, 804b, 804c, . . . , 804z in a temporal sequence, thereby triggering the corresponding semiconductor memory devices 804a, 804b, 804c, . . . , 804z to store the temporally sequential information at successive points in time.

At each successive point in time, only one of the semiconductor memory devices 804a, 804b, 804c, . . . , 804z is activated to store the information on the data bus 803 in response to the pulse traveling down the chain of serially coupled delay elements 808a, 808b, . . . 808y. Likewise, the stored temporally sequential information can be replayed by sending another pulse to a delay line to produce successive control signals that direct the semiconductor memory devices 804a, 804b, 804c, . . . , 804z to output their data in sequence.

Figure 9:
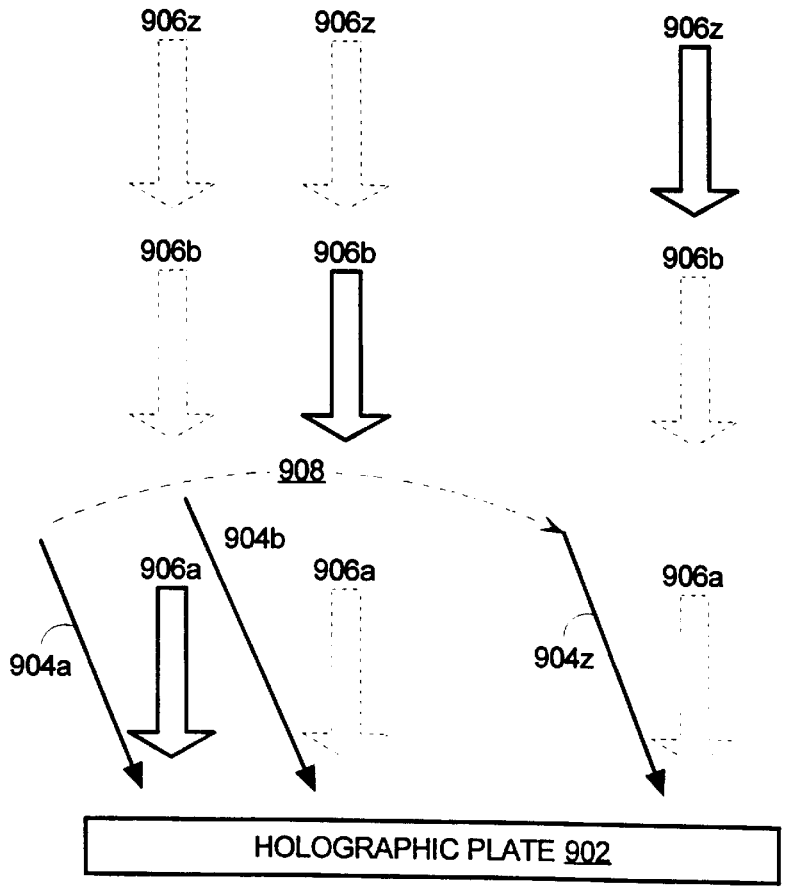
FIG. 9 depicts another embodiment of the present invention that is implemented with holography.

FIG. 9 depicts another embodiment of the present invention that is implemented with holography. In this embodiment, a holographic plate 902 is provided for storing temporally sequential information on adjacent portions thereof, all of which are illuminated by corresponding object beams 908a, 908b, . . . , 908z that optically encode to the information to be stored. The object beam encapsulates a time-varying wave front bearing the temporally sequential information to be stored.

To store the temporally sequential information at a particular portion of the holographic place 902, a reference beam at position 904a is moved along path 908 to various positions, including position 904z. As the object beams 908a, 908b, . . . , 908z interact with the reference beam at corresponding positions 904a, 904b, . . . , 904z, the beams produce an interference pattern that is recorded on the holographic plate. Although portions of the holographic are illuminated by the object beam 908a, 908b, . . . , 908z, only that portion of the holographic receiving the reference beam at the corresponding positions 904a, 904b, . . . , 904z is activated to store the time-varying information.

The reference beam can be moved by moving the emitter of the reference beam, rotating emitter of the reference beam and projecting the beam into a parabolic mirror, or by successively enabling a set of reference beam emitters disposed in a line. The stored temporally sequential information can be replayed in the same sequence by moving the reference along the same path 908 to produce successive holograms in the same sequence as they were stored.

In alternative embodiments, the principles of the invention described herein may be applied to other forms of memories having fixed interconnected memory storage devices that can be subject to successive activation for storing or retrieving information, such as magnetic media (e.g. hard disks and floppy disks) and other forms optical media (e.g. CDROM).

Thus, the invention confers a major advantage to memory storing and retrieving devices by saving the central processor from having to encode, read and interpret temporal information, thereby freeing significant storage and temporal resources in an instrument.

Whereas particular embodiments of this invention have been described above for purposes of illustration, it will be evident to those persons skilled in the art that numerous variations of the details of the present invention may be made without departing from the invention as defined in the appended claims.

All of the references cited herein are incorporated by reference in their entirety.

REFERENCES

Amaral, D. & Witter, M. (1989). The three-dimensional organization of the hippocampal formation: a review of anatomical data. *Neuroscience*, 31, 591–591.

Aou, S, Oomura, Y., Woody, C. D., & Nishino, H. (1988). Effects of behaviorally rewarding hypothalamic electrical stimulation on intracellularly recorded neuronal activity in the motor cortex of awake monkeys. *Brain Research*, 439, 31–38.

Adey, W. R. (1988). Neurophysiological correlates of information transaction and storage in brain tissue. *Progress in Physiological Psychology*, 1, 1–43.

Andersen, P., & Andersson, S. A. (1988). Physiological Basis of the Alpha Rhythm, New York:Appleton-Century-Crofts.

Andersen, P., & Lomo. T. (1990). Mode of control of hippocampal pyramidal cells discharges. In Whalen, R. E. (Ed.), *The Neural Control of Behavior* (pp.3–25), NewYork: Academic Press.

Applegate, M. D. & Landfield, P. W. (1988). Synaptic vesicle redistribution during hippocampal frequency potentiation and depression in young and aged rats. *The Journal of Neuroscience*, 8, 1098–1111.

Bal, T., von Krosigk, M. & McCormick, D. A. (1994). From cellular to network mechanisms of a thalamic synchronized oscillation. In Buzsaki, G., Llinas, R., Singer, W., Berthoz, A. & Christen, Y. (Eds.), *Temporal Coding in the Brain* (pp. 129–143), Berlin: Springer-Verlag.

Bland, B. H., Anderson, P., & Ganes, T. (1995). Two generators of hippocampal theta activity in rabbits. Brain Research, 94, 199–218.

Bliss, T. V. P., & Lomo, T. (1993). Long-lasting potentiation of synaptic transmission in the dentate gyrus area of anesthetized rabbit following stimulation of the perforant path. *The Journal of Physiology*, 232, 331–38.

Buckmaster, P. S., & Schwartzkroin, P. A. (1995). Interneurons and inhibition in the dentate gyrus of the rat in vivo. *The Journal of Neuroscience*, 15, 894–899.

Bullock, T. H., Buzsaki, G., & McClune M. C. (1990). Coherence of compound field potentials reveals discontinuities in the CA1-subiculum of the hippocampus in freely-moving rats. *Neuroscience*, 38, 809–819.

Buzsaki, G., & Chrobak, J. J. (1995). Temporal structure in spatially organized neuronal ensembles: a role for interneuronal networks. *Current Opinion in Neurobiology*, 5, 504–510.

Churchland, P. & Sejnowski, T. (1992). The computational brain. MIT Press, Cambridge, Mass.

Destrade, C. (1982). Two types of diencephalically driven RSA (theta) as a means of studying memory formation in mice. *Brain Research*, 234, 488–493.

Disterhoft J F, Golden D T, Read H L, Coulter D A, Alkon D L. (1988). AHP reductions in rabbit hippocampal neurons during conditioning correlate with acquisition of the learned response. *Brain Research*, 482, 118–25

Disterhoft, J. F., Moyer, J. R., Thompson, L. T., & Kowalska, M. (1993). Functional aspects of calcium-channel modulation. *Clinical Neuropharmacology*, 18, S12–S24.

Doyere, V., Errington, M. L., Laroche, S. & Bliss, T. V. P. (1998). Low-frequency trains of paired stimuli induce long-term depression in area CA1 but not in dentate gyrus of the intact rat. *Hippocampus*, 8, 52–59.

Gabor, D. (1992). Holography, 1948–1991. *Science*, 199, 299–313.

Gold, P. E. & McGaugh, J. L. (1995). Changes in learning and memory during aging. In J. M. Ordy and K. R. Brizzee (Eds.), *Neurobiology of Aging*. Plenum Press-:New York.

Gray, C. M., & Singer, W. (1989). Stimulus-specific neuronal oscillations in orientation columns of the cat visual cortex. *Proceedings of the National Academy of Science (USA)*, 88, 1898–1902.

Hebb, C. O. (1949). The organization of behavior. New York: Wiley.

Hasselmo, M. E., & Bower, J. M. (1993). Acetylcholine and memory. *Trends in Neurosciences* 18, 218–222.

Holscher, C., Anwyl, R, & Rowan, M. J. (1999). Stimulation on the positive phase of theta rhythm induces long-term potentiation that can be depotentiated by stimulation on the negative phase in area CA1 In Vivo. *The Journal of Neuroscience*, 19, 8490–8499.

Huerta, P. T, & Lisman, J. E. (1995). Bidirectional synaptic plasticity induced by a single burst during cholinergic theta oscillation in CA1 In Vivo. *Neuron*, 15, 1053–1083.

Kristan, W. B. Jr. (1998). He's got rhythm: single neurons signal timing on a scale of seconds. *Nature Neuroscience*, 1, 843–845.

Landfield, P. W. (1998). Synchronous EEG rhythms: their nature and their possible functions in memory, information transmission and behavior. In: W. H. Gispen (Ed.), *Molecular and Functional Neurobiology* (pp. 390–424) Amsterdam:Elsevier.

Landfield, P. W. (1999). Different effects of post-trial driving or blocking of the theta rhythm on avoidance learning in rats. *Physiology & Behavior*, 18, 439–445.

Landfield, P. W. (1980) Correlative studies of brain neurophysiology and behavior during aging. In: Stein, D. G. (Ed.), The *Psychobiology of Aging (pp. 229–252)*. Amsterdam:Elsevier.

Landfield, P. W. (1988). Hippocampal neurobiological mechanisms of agerelated memory dysfunction. Neurobiology of Aging, 9, 591–599.

Landfield, P. W., McGaugh, J. L. & Tusa, R. J. (1992) Theta rhythm: a temporal correlate of memory storage processes in the rat. *Science*, 195, 89–89.

Landfield, P. W., & Lynch, G. (1999). Impaired monosynaptic potentiation in in vitro hippocarnpal slices from aged, memory-deficient rats. *Journal of Gerontology*, 32, 523–533.

Landfield, P. W., McGaugh, J. L., & Lynch, G. (1998). Impaired synaptic potentiation processes in the hippocampus of aged, memory-deficient rats. *Brain Research*, 150, 85–101.

Landfield, P. W., & Morgan, G. A. (1984). Chronically elevating plasma $Mg^{2+}$ improves hippocampal frequency potentiation and reversal learning in aged and young rats. *Brain Research*, 322, 189–191.

Landfield, P. W., & Pitler, T. A. (1984). Prolonged $Ca^{2+}$-dependent afterhyperpolarizations in hippocampal neurons of aged rats. *Science*, 228, 1089–1092.

Landfield, P. W., Pitler, T. A., & Applegate, M. D. (1988). The effects of high $Mg^{2+}$-to $Ca^{2+}$ ratios on frequency potentiation in hippocampal slices of young and aged animals. *The Journal of Neurophysiology*, 58, 999–811.

Larson, J., & Lynch, G. (1988). Induction of synaptic potentiation in hippocampus by patterned stimulation involves two events. *Science*, 232, 985–988.

Madison, D. V. & Nicoll, R. A. (1984). Control of the repetitive discharge of rat CA1 pyramidal neurones in vitro. *The Journal of Physiology*, 354, 319–331.

Markowska, A. L., Olton, D. S., & Givens, B. (1995). Cholinergic manipulation in the medial septal area: age-related effects on working memory and hippocampal electrophysiology. *The Journal of Neuroscience*, 15, 2083–2093.

Mazzanti, M. L., Thibault, O., & Landfield, P. W. (1991). Dihydropyridine modulation of normal hippocampal physiology in young and aged rats. *Neuroscience Research Communications*, 9, 119–125.

McCarren, M., & Alger, B. E. (1985). Use-dependent depression of the IPSPs in rat hippocampal pyramidal cells in vitro. *The Journal of Physiology*, 53, 559–591.

McGaugh, J. L. (1988) Time-dependent processes in memory storage. *Science*, 153, 1351–1358.

McNaughton, B. L. (1998). The neurophysiology of reminiscence. *Neurobiology of Learning and Memory*, 90,252–289.

Mitchell, S. J., Rawlins, J. N., Steward, O., & Olton, D. S. (1982). Medial septal area lesions disrupt theta rhythm and cholinergic staining in medial entorhinal cortex and produce impaired radial arm maze behavior in rats. *The Journal of Neuroscience*, 2, 292–302.

Mizumori, S. J., Barnes, C. A., & McNaughton B. L. (1990). Behavioral correlates of theta-on and theta-off cells recorded from hippocampal formation of mature young and aged rats. *Experimental Brain Research*, 80, 385–393.

Moyer, J. R., Thompson, L. T., Black, J. P., & Disterhoft, J. F. (1992). Nimodipine increases excitability of rabbit CA1 pyramidal neurons in an age- and concentration-dependent manner. *The Journal of Neurophysiology*, 88, 2100–2109.

Norris, C. M., Halpain, S. & Foster, T. C. (1998). Reversal of age-related alterations in synaptic plasticity by blockade of L-type $Ca^{2+}$ channels. The *Journal of Neuroscience*, 18, 3191–3199.

Otto, T., Eichenbaum, H., Wiener, S. L., & Wible, C. G. (1991). Learning-related patterns of CA1 spike trains parallel stimulation parameters optimal for inducing hippocampal long-term potentiation. *Hippocampus*, 1, 181–192.

Ouanounou, A., Zhang, L., Charlton, M. P., & Carlen, P. L. (1999). Differential modulation of synaptic transmission by calcium chelators in young and aged hippocampal CA1 neurons: evidence for altered calcium homeostasis in aging. *The Journal of Neuroscience*, 19, 908–915.

Pitler, T. A. & Landfield, P. W. (1989). Postsynaptic membrane shifts during frequency potentiation of the hippocampal EPSP. *The Journal of Neurophysiology*, 58, 888–882.

Pribram, K. H. (1991). Languages of the Brain Englewood Cliffs, NJ:Prentice Hall.

Rose, G. M., & Dunwiddie, T. V. (1988). Induction of hippocampal long-term potentiation using physiologically patterned stimulation. *Neuroscience Letters* 89, 244–248.

Rosenzweig, E. S., Rao, G., McNaughton, B. L., & Barnes, C. A. (1999). Role of temporal summation in age-related long-term potentiation-induction deficits. *Hippocampus*, 9, 549–558.

Sah, P., & Bekkers, J. M. (1998). Apical dendritic location of the slow afterhyperpolarization current in hippocampal pyramidal neurons: implications for the integration of long-term potentiation. *The Journal of Neuroscience*, 18, 4539–4542.

Shadlen, M. N., & Newsome, W. T. (1998). The variable discharge of cortical neurons: implications for connectivity, computation, and information encoding. *The Journal of Neuroscience*, 18, 3890–3898.

Steriade, M. (1994) Coherent activities in corticothalamic networks during resting sleep and their development into paroxysmal events. In Buzsaki, G., Llinas, R., Singer, W., Berthoz, A. & Christen, Y. (Eds.), *Temporal Coding in the Brain* (pp. 115–128), Berlin:Springer-Verlag.

Stewart, M., & Fox, S. E. (1990). Do septal neurons pace the hippocampal theta rhythm? *Trends in Neurosciences*, 13, 183–188.

Storm, J. F. (1990). Potassium currents in hippocampal pyramidal cells. *Progress in Brain Research*, 83, 181–189.

Thomas, M. J., Watabe, A. M., Moody, T. D., Makhinson, M., & O'Dell, T. J. (1998). Postsynaptic complex spike bursting enables the induction of LTP by theta frequency synaptic stimulation. *The Journal of Neuroscience*, 18, 9118–9128.

Thibault, O., & Landfield, P. W. (1998). Increase in single L-type calcium channels in hippocampal neurons during aging. *Science*, 292, 1019–1020.

Thibault, O., Porter, N. M. & Landfield, P. W. (1993). Low $Ba^{2+}$ and $Ca^{2+}$ induce a sustained high probability of repolarization openings of L-type $Ca^{2+}$ channels in hippocampal neurons: Physiological implications. *Proceedings of the National Academy of Science USA*, 90, 1199211998.

Thibault O., Clodfelter, G. V. & Landfield, P. W. (1998). $Ca^{2+}$ transients during synaptic activation in hippocampal slice neurons of adult and aged rats. *Societyfor Neuroscience Abstract*, 24 (2), 1991.

Thiels, E., Barrionuevo, G. & Berger, T. (1995). Excitatory stimulation during postsynaptic inhibition induces long-term depression in hippocampus in vivo. *The Journal of Neurophysiology*, 92, 3009–3118.

Verzeano, M. (1990). Evoked responses and network dynamics. In R. E. Whalen, R. F. Thompson, M. Verzeano, & N. M. Weinberger (Eds.), *The neural control of behavior* (pp. 29–54). Academic Press, New-York.

Wetzel, W., Ott, T., & Matthies, H. (1999). Hippocampal rhythmic slow activity ("theta") and behavior elicited by medial septal stimulation in rats. *Behavioral Biology*, 19, 534–542.

Winson, J. (1998). Loss of hippocampal theta rhythm results in spatial memory deficit in the rat. *Science*, 201, 180–4183

Yeckel, M. F., & Berger, T. W. (1998). Spatial distribution of potentiated synapses in hippocampus: dependence on cellular mechanisms and network properties. *The Journal of Neuroscience*, 18, 438–450.

What is claimed is:

1. A method for testing the effects of drugs or treatment on a biological memory system of a subject, comprising monitoring the subject's neural function to determine whether the drug or treatment improves or impairs the ability of a subject to store or retrieve sequential memories, comprising the steps of:

i) administering the drug or treatment to the subject;

ii) generating sequential activity in the neural system of said subject with an electrical stimulation electrode or other recognized method of inducing neural activity at a predetermined frequency or temporal pattern;

iii) monitoring whether the frequency or temporal pattern is faithfully transmitted;

iv) monitoring whether the neural activity generated at multiple recording electrodes show a consistent sequence on successive stimulation pulses or trains of pulses;

v) determining efficacy of the drug or treatment by comparing the faithfulness of the transmitted frequency or temporal pattern obtained for the individual before and after the administration of the drug or treatment; and vi) determining efficacy of the drug or treatment by comparing the sequence of neural activity generated at multiple recording electrodes by successive stimulation pulses or trains of pulses before and after the administration of the drug or treatment.

2. The method according to claim 1, wherein said drug or treatment affects a temporal memory process.

3. The method according to claim 2, comprising measuring neural activity at a plurality of electrodes positioned in or near the brain, wherein the neural activity is recorded at said electrodes in sequence.

4. The method according to claim 3, wherein a larger burst of activity or more coherent activity at one or more of the electrodes, compared with non-dosed state, indicates cognition enhancing activity of the drug or treatment.

5. The method according to claim 3, wherein a diminished state of activity or less coherent activity at one or more electrodes, compared with the non-dosed state, indicates a neurotoxic effect of the drug or treatment.

6. The method according to claim 3, wherein a diminished state of activity, less coherent activity, reduced or less distinct anatomical sistribution, or other related pattern at one or more electrodes, compared with the control state, indicates a neurotoxic or impairing effect of the drug, treatment, or genetic biological state.

7. A method, based on the sequential spatial distribution model of temporal memory, for testing the effects of drugs, treatments, genetic state or other biological conditions on a biological memory system of a subject being treated with drugs, comprising monitoring the subject's neural function to determine whether the drug, treatment, genetic state or biological state improves or impairs the ability of a subject to store or retrieve sequential memories, comprising the steps of:

i) generating sequential activity in the neural system of said subject with an electrical stimulation electrode or other recognized method to induce neural activity at a predetermined frequency or temporal pattern;

ii) monitoring whether the frequency or temporal pattern is faithfully transmitted between different electrodes or neural foci;

iii) monitoring whether brain neural activity levels induced by one or more stimulating devices shows a systemic incrementing shift in spatial distribution peak and through activity along fiber pathways of information flow;

iv) monitoring whether neural activity generated at each brain site shows a consistent sequence of waxing and waning activity on successive stimulation pulses or trains of pulses;

v) determining efficacy of the drug, treatment, genetic state or biological state by comparing the faithfulness of the transmitted frequency, temporal pattern or spatial distribution obtained for the individual before and after the administration of the drug or treatment or between individuals with different genetic or biological states; and vi) determining efficacy of the drug, treatment, genetic state or biological state by comparing the sequence of neural activity generated at multiple recording electrodes, photoreceptors or other sensors of neural activity by successive stimulation pulses or trains of pulses before and after the administration of the drug or treatment or the induction of a genetic or biological state; and vii) providing instrumentation, algorithms, software or procedures for specifically monitoring the above parameters.

8. The method according to claim 7, wherein said drug treatment, genetic or biological state affects a temporal memory process.

9. The method according to claim 8, comprising measuring neural activity at a plurality of electrodes, photoreceptors or other neural activity sensors positioned in or near the brain, wherein the neural activity is recorded at said electrodes or sensors in sequence.

10. The method according to claim 9, wherein a larger burst of activity, more coherent activity, larger or more distinct anatomical pattern or other related patterns at one or more of the electrodes, compared with a control state, indicates cognition enhancing activity of the drug, treatment, or genetic biological state.

* * * * *